United States Patent
Gupta et al.

(10) Patent No.: US 11,978,267 B2
(45) Date of Patent: May 7, 2024

(54) AUTOMATIC MULTI-PLATE RECOGNITION

(71) Applicant: Verkada Inc., San Mateo, CA (US)

(72) Inventors: Mayank Gupta, Foster City, CA (US); Suraj Arun Vathsa, Irvine, CA (US); Song Cao, Foster City, CA (US); Yi Xu, Belmont, CA (US); Yuanyuan Chen, San Mateo, CA (US); Yunchao Gong, Los Altos, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/168,530

(22) Filed: Feb. 13, 2023

(65) Prior Publication Data
US 2023/0343114 A1    Oct. 26, 2023

Related U.S. Application Data

(63) Continuation-in-part of application No. 18/064,883, filed on Dec. 12, 2022, which is a continuation of
(Continued)

(51) Int. Cl.
*G06V 20/62*    (2022.01)
*G06V 10/774*   (2022.01)
(Continued)

(52) U.S. Cl.
CPC .......... *G06V 20/625* (2022.01); *G06V 10/774* (2022.01); *G06V 20/54* (2022.01); *G06V 30/148* (2022.01)

(58) Field of Classification Search
None
See application file for complete search history.

(56) References Cited

U.S. PATENT DOCUMENTS

| 5,982,929 A | 11/1999 | Ilan et al. |
| 10,423,827 B1 | 9/2019 | Wu et al. |

(Continued)

FOREIGN PATENT DOCUMENTS

| CN | 109657629 A | 4/2019 | |
| GB | 2598640 A * | 3/2022 | ............... G06T 7/70 |

(Continued)

OTHER PUBLICATIONS

Zhang, Cong, Qi Wang, and Xuelong Li. "V-LPDR: Towards a unified framework for license plate detection, tracking, and recognition in real-world traffic videos." Neurocomputing 449 (2021): 189-206. (Year: 2021).*

(Continued)

*Primary Examiner* — Sean M Conner
(74) *Attorney, Agent, or Firm* — Perkins Coie LLP; Michael A. Glenn

(57) ABSTRACT

A method and related system operations include obtaining a video stream with an image sensor of a camera device, detecting a plurality of target objects by executing a neural network model based on the video stream with a vision processor unit of the camera device. The method also includes generating a plurality of bounding boxes, determining a plurality of character sequences by, for each respective bounding box of the plurality of bounding boxes, performing a set of optical character recognition (OCR) operations to determine a respective character sequence of the plurality of character sequences. The method also includes updating a plurality of tracklets to indicate the plurality of bounding boxes and storing the plurality of tracklets in association with the plurality of character sequences in a memory of the camera device.

20 Claims, 11 Drawing Sheets

Related U.S. Application Data application No. 17/871,786, filed on Jul. 22, 2022, now Pat. No. 11,557,133.

(60) Provisional application No. 63/363,442, filed on Apr. 22, 2022.

(51) Int. Cl.
  *G06V 20/54* (2022.01)
  *G06V 30/148* (2022.01)

(56) References Cited

U.S. PATENT DOCUMENTS

| | | |
|---|---|---|
| 11,557,133 B1 | 1/2023 | Xu et al. |
| 2009/0202152 A1 | 8/2009 | Takebe et al. |
| 2009/0263021 A1* | 10/2009 | Takamori ............... G06V 20/52 382/181 |
| 2013/0272579 A1* | 10/2013 | Burry ................ G06V 20/63 382/105 |
| 2016/0019428 A1* | 1/2016 | Renner ................ G06T 7/0004 382/195 |
| 2016/0247257 A1* | 8/2016 | Cheung .................. H04N 7/181 |
| 2017/0337435 A1 | 11/2017 | Uliyar et al. |
| 2018/0373934 A1* | 12/2018 | Bridges ................ G06V 10/993 |
| 2019/0051127 A1* | 2/2019 | Kanga ............. G08B 13/19658 |
| 2019/0108410 A1* | 4/2019 | Zhang ................. G06V 20/582 |
| 2019/0228276 A1 | 7/2019 | Lei et al. |
| 2020/0005050 A1 | 1/2020 | Higuchi |
| 2020/0202535 A1 | 6/2020 | Lee et al. |
| 2021/0089790 A1 | 3/2021 | Nishimura et al. |
| 2021/0097277 A1* | 4/2021 | Hirai ........................ G06N 3/08 |
| 2021/0303899 A1 | 9/2021 | Mains et al. |
| 2022/0076042 A1 | 3/2022 | Zhao et al. |
| 2022/0101037 A1 | 3/2022 | Chua et al. |
| 2022/0129688 A1 | 4/2022 | Yu et al. |
| 2022/0207889 A1* | 6/2022 | Lin ........................ G06V 10/25 |
| 2022/0335824 A1* | 10/2022 | Carson ................ G06V 10/757 |

FOREIGN PATENT DOCUMENTS

| | | |
|---|---|---|
| KR | 102105705 B1 | 4/2020 |
| KR | 102200204 B1 | 1/2021 |

OTHER PUBLICATIONS

Wang, Junhui, et al. "Ultra-Fast Mini License Plate Recognition System Based-on Vision Processing Unit." 2020 2nd International Conference on Big-data Service and Intelligent Computation. 2020. (Year: 2020).*

Lynch, Ms. "Automated License Plate Recognition (ALPR) System." (2012). (Year: 2012).*

Liu, Zhemin, Weiling Chen, and Chai Kiat Yeo. "Automatic detection of parking violation and capture of license plate." 2019 IEEE 10th Annual Information Technology, Electronics and Mobile Communication Conference (IEMCON). IEEE, 2019. (Year: 2019).*

Sadhukhan, Pampa. "An IoT-based E-parking system for smart cities." 2017 International conference on advances in computing, communications and informatics (ICACCI). IEEE, 2017. (Year: 2017).*

Cowdrey, Kevin William George, and Reza Malekian. "Home automation—an IoT based system to open security gates using number plate recognition and artificial neural networks." Multimedia Tools and Applications 77 (2018): 20325-20354. (Year: 2018).*

Gandhi, BM Kumar, and M. Kameswara Rao. "A prototype for IoT based car parking management system for smart cities." Indian Journal of Science and Technology 9.17 (2016): 1-6. (Year: 2016).*

Xi, Jie, et al. "A video text detection and recognition system." IEEE International Conference on Multimedia and Expo, 2001. ICME 2001 . . . IEEE Computer Society, 2001. (Year: 2001).*

Safaei, Amin, Hongying L. Tang, and Saeid Sanei. "Real-time search-free multiple license plate recognition via likelihood estimation of saliency." Computers & Electrical Engineering 56 (2016): 15-29. (Year: 2016).*

International Search Report and Written Opinion for WO Patent Application No. PCT/US23/66044 dated Aug. 11, 2023, 13 pages.

* cited by examiner ically designed for the task. Among its many uses, ANPR
AUTOMATIC MULTI-PLATE RECOGNITION

CROSS-REFERENCE TO RELATED APPLICATIONS

This application is a continuation-in-part of U.S. Utility application Ser. No. 18/064,883 (titled "Automatic License Plate Recognition" and filed on Dec. 12, 2022) which is a continuation of U.S. Utility application Ser. No. 17/871,786 (titled "Automatic License Plate Recognition" and filed on Jul. 22, 2022) which claims priority to U.S. Provisional Application No. 63/363,442 (titled "Automatic License Plate Recognition" and filed on Apr. 22, 2022), each of which are incorporated by reference herein in their entirety by this reference thereto.

FIELD

Various of the disclosed embodiments concern automatic license plate recognition.

BACKGROUND

Automatic license plate (or number plate) recognition (ANPR) is a technology that uses optical character recognition on images to read vehicle registration plates to create vehicle location data. It can use existing closed-circuit television, road-rule enforcement cameras, or cameras specifically designed for the task. Among its many uses, ANPR is used by police forces around the world for law enforcement purposes, including to check if a vehicle is registered or licensed. It is also used for electronic toll collection on pay-per-use roads and as a method of cataloging the movements of traffic, for example, by highway agencies.

There are several difficulties attendant with ANPR. These include, for example: poor file resolution, usually because the license plate is too far away, but sometimes resulting from the use of a low-quality camera; blurry images, particularly blurriness because of motion; poor lighting and low contrast due to overexposure, reflection, or shadows; an object obscuring part of the plate, quite often a tow bar, or dirt on the plate; license plates that are different at the front and the back of the vehicle because of towed trailers, campers, etc.; vehicle lane change in the camera's angle of view during license plate reading; use of a nonstandard font, which is popular for vanity plates; circumvention techniques; and/or lack of coordination between countries or states. Two cars from different countries or states can have the same license plate number but different plate designs.

SUMMARY

Automatic license plate recognition occurs when a camera that continually captures video detects motion as a vehicle is driven through a gate. The camera detects the vehicle and license plate in the video stream captured by the camera. An algorithm associated with the video stream of the camera is trained to detect license plates. The camera starts executing the recognition algorithm when it detects motion. Recognition of characters in the license plate is based upon an aggregation of several captured video frames in which a license plate is detected.

In addition, many existing tracking methods are limited to single frame analysis methods that are unable to track license plates or other target objects in real time. Such methods may be limited to trigger-based systems that are active for tracking only when a particular object or target character sequence of the object has been detected. These conventional methods may alternatively rely on cloud-based systems, but such systems are limited by network performance issues that may severely limit the quality of an image being uploaded, which may have a consequent detrimental effect on any downstream analysis of the image.

Some embodiments may use a vision processor or other specialized circuitry that helps overcome such deficiencies. For example, some embodiments may use a video stream as an input for a neural network model that is executed by a vision processor unit (VPU) for each frame of the video stream. The neural network model may be configured to detect the presence of a target object in an image and may output a set of tracklets. Each tracklet of the set of tracklets may include or otherwise indicate a set of image subregions over the sequence of frames of the video stream. The set of image subregions may surround or otherwise indicate the target object, where some embodiments may perform downstream operations, such as optical character recognition on the set of image subregions corresponding with the target object. Once the sequence of characters corresponding with the target object is determined, some embodiments may store, in a memory, a record of the tracklet in association with a record identifier that includes the sequence of characters.

DETAILED DESCRIPTION

In typical commercial automatic license plate recognition (ANPR) systems a physical trigger starts the operation of a camera which captures a single image that is used to detect the characters on the license plate. There are various limitations with this approach including false triggering, failure to trigger, lack of coordination of the triggering event with the position of the license plate, defective image capture, a blurry or clipped image, and the like.

Figure 1:
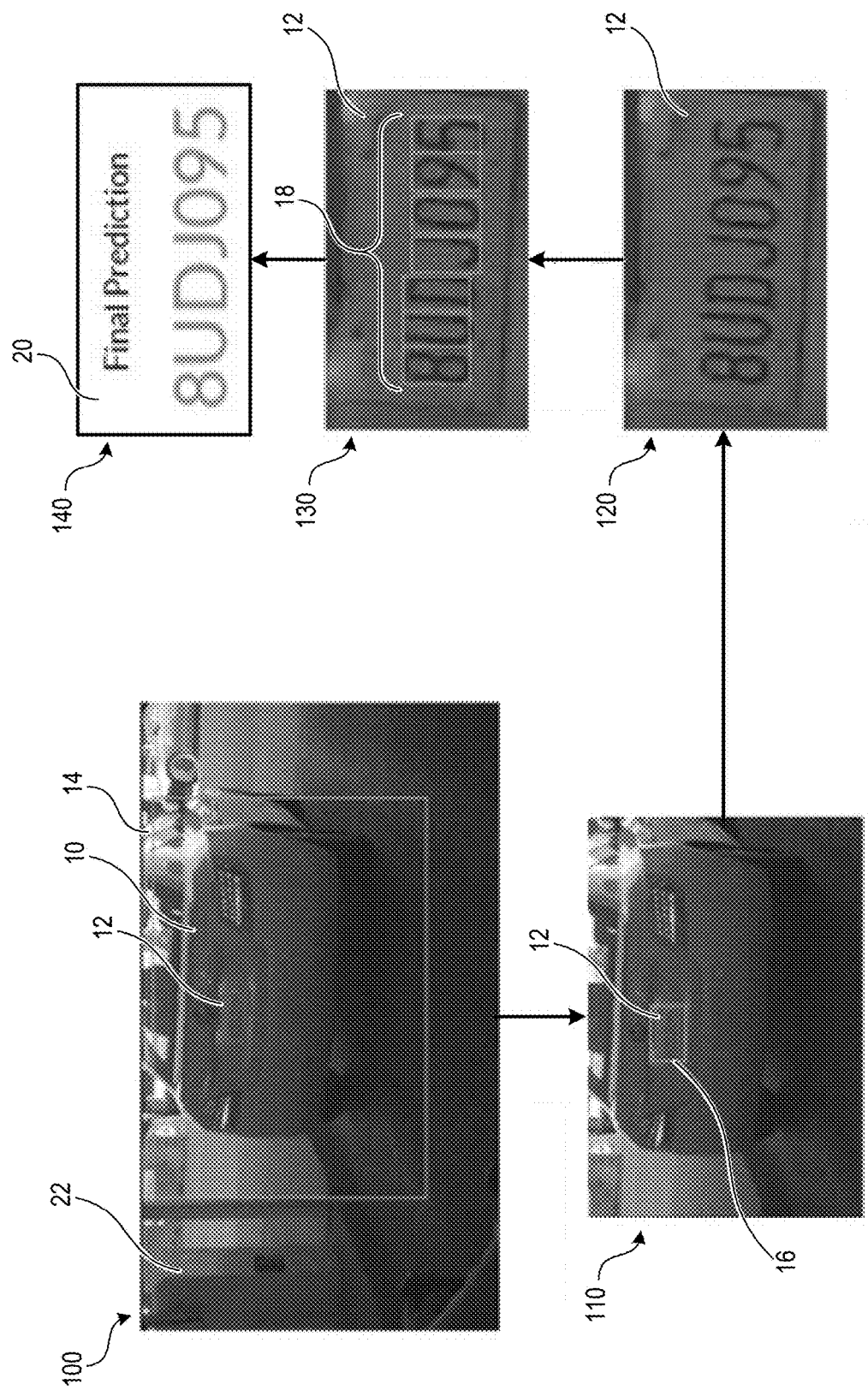
FIG. 1 shows an automatic license plate recognition system, in accordance with some embodiments.

FIG. 1 shows an automatic license plate recognition system, in accordance with some embodiments. In embodiments of the invention, in step 100, license plate recognition begins when a vehicle 10 passes through a detection point 22. There is no switch. Everything is detected by the camera when the vehicle 10 trips a detector, such as a laser beam that operates a camera in response thereto.

As a vehicle is driven through a gate, the camera detects motion while it continually captures video. The camera detects the vehicle and license plate in the video stream. An algorithm associated with the video stream of the camera is trained to detect license plates. It ignores other objects such as a person who happens to walk up to and through the gate. The camera is always operating. The camera starts executing a recognition algorithm when it detects motion. Whenever the camera detects any kind of motion, the recognition algorithm starts looking for license plates regardless of whether the motion is caused by a person, a tree, or any other moving object. Thus, upon detecting motion, the camera always starts looking for a license plate.

Motion is detected and then the camera starts capturing video. The camera is pointed in the direction where it expects to see a license plate. When the camera sees something in the frame that looks like a license plate, it starts grabbing frames. Because the camera captures video, it grabs more than one frame, i.e., the camera grabs multiple frames, e.g., one or two frames per second, although the camera may be set to grab 10 frames or more per second.

The camera captures several frames of video of a license plate 12. Each frame is a high-resolution image that is presented to a processing pipeline, and a final prediction is generated for each frame. The frame predictions are then aggregated.

After a predetermined number of frames are detected, such as 10 frames, an algorithm associated with the camera starts looking for the license plate. This action is performed for every frame captured by the camera in which motion is detected. Thus, whenever the camera detects motion, the camera tries to detect a license plate for every frame with a motion trigger.

For each frame there is a user-defined region of interest, i.e., a rectangle 14. Accordingly, when a vehicle pulls up to the gate, the camera notices motion. The camera detects the license plate within the user-defined region of interest 14 and captures a video frame that contains the license plate. As the vehicle continues to move, the camera captures additional frames of the license plate. The algorithm associated with the camera uses these frames for character detection.

At a next step 110, a license plate detector model produces a thumbnail of a defined region of interest, as shown in FIG. 1 by the rectangle 16, in which the license plate is located.

Significantly, embodiments of the invention do not detect vehicles and then license plates. Rather, embodiments of the invention directly detect license plates within each image of the several frames of video captured after the vehicle triggers the video collection process.

Once the license plate thumbnail of the image is detected, the license plate is cropped in step 120 from the high-resolution image. An algorithm detects each of the rectangles in the cropped image, i.e., where the license plate is located in the image.

In step 130, character detection is performed for each frame by an object detector to allow optical character recognition (OCR). Object detection identifies each character in the license plate, as shown by the series of rectangles 18, one rectangle for each character. The rectangles are arranged for character detection from the left to the right.

In step 140, after character recognition, there is a final prediction that results in the license-plate sequence. The algorithm integrates the frames. It is initially assumed that all the predictions are correct; however, there might be slight errors. Accordingly, the algorithms examine several frames, e.g., five frames. The algorithm looks for the most common length of the text. For example, the recognized characters are: 8 U D J 0 9 5. The algorithm looks for the most common length. In this example, there are seven characters. It is assumed that the final output is seven characters long. The algorithm only looks at the frames which have an output that is seven characters long. For each position, the algorithm looks at the character having the greatest confidence value. In this example, the first frame has the most confidence for the first character. In this example, the character is an 8. The algorithm selects the 8. For the second position, which in this example is a U, the algorithm looks at all five frames and then looks at the second character in all five frames. The model determines a confidence value for each character. In this example, the algorithm looks at the confidence value for the second character in all the five frames and selects the character in the frame that has the greatest confidence value. This process continues until the entire string, in this example seven characters, is constructed.

Embodiments of the invention also take into consideration the position of the boxes and optimize them even further. For example, instead of looking at the final string, the algorithm looks at the boxes that are produced and correlates these boxes to one another over multiple frames based on how they are positioned. The algorithm then makes a one-to-one correspondence between the boxes based on the position of each box. Thereafter, a confidence value can be established for each character at each position based on the several frames.

Figure 2:
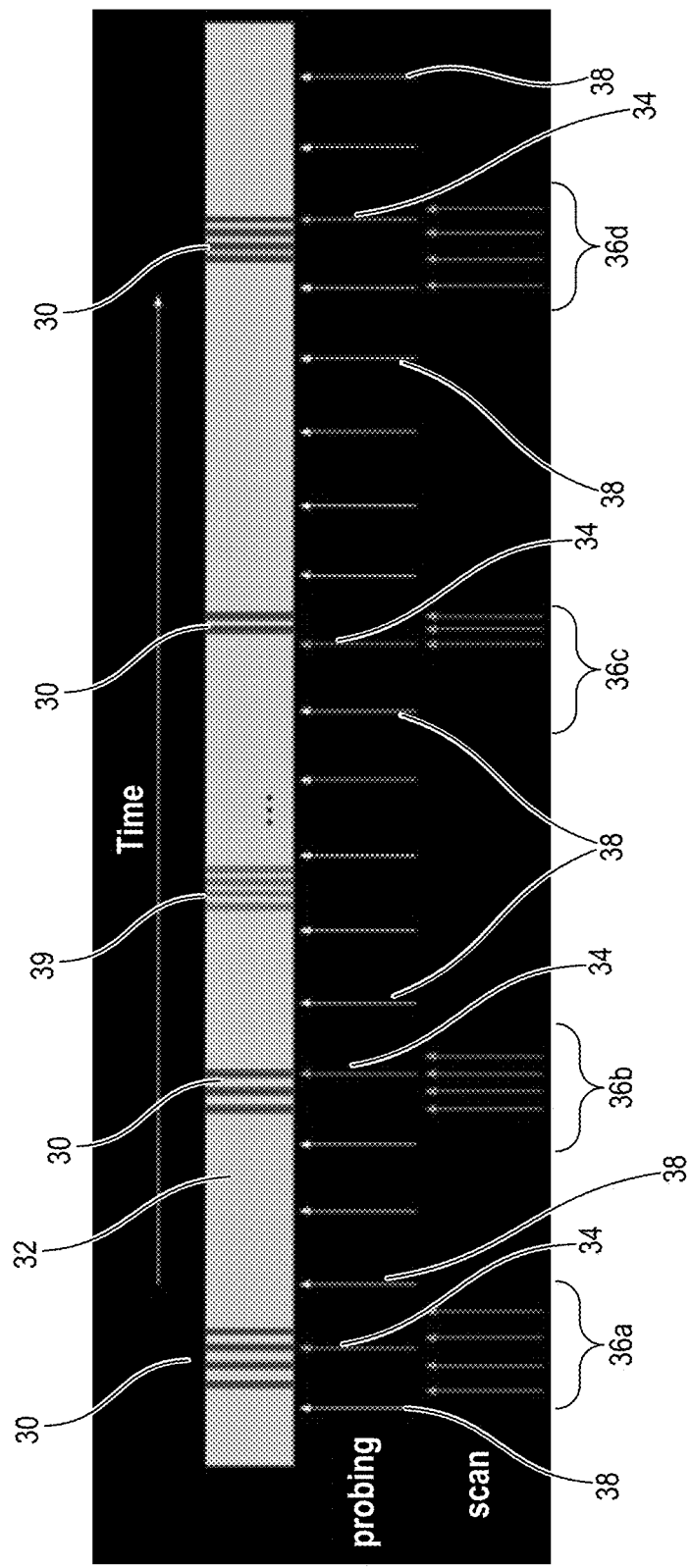
FIG. 2 is a timing diagram showing frame aggregation, in accordance with some embodiments.

FIG. 2 is a timing diagram showing frame aggregation, in accordance with some embodiments. In FIG. 2, multiple frames are shown. Several frame, e.g., five frames, are captured for each vehicle. The information within the frames is then aggregated. That is, an algorithm combines the results of the five frames.

Embodiments of the invention optimize central processing unit (CPU) time based on when the CPU is used. By default, the frames are probed. Frames 30 are shown along a bar 32 within a flow of time. The algorithm probes, for example, one frame out of every three. Alternatively, the frames are probed at intervals, for example, every two seconds. An arrow 34 signifies a frame in which a license plate is detected.

In FIG. 2, embodiments of the invention use the collection of detection models in TensorFlow Model Zoo API's CenterNet and MobileNet models with a low depth multiplier. Embodiments of the invention also use a probing algorithm to optimize overall compute resource usage for better precision and recall.

A buffer of frames is maintained. Whenever the camera detects the license plate, the algorithm is aware that there is a license plate in the frame, and it examines multiple frames near the timestamp of the frame in which the license plate is detected. For example, the 20 most recent frames are buffered. Accordingly, there is a list of recent frames. Whenever a license plate is detected in a frame, the buffer is checked. The algorithm examines several frames, e.g., five frames, that surround the detected frame, which is represented by the scan 36*a*, 36*b*, 36*c*, 36*d*.

The algorithm only uses computation time whenever a vehicle is detected. Whenever a probe detects a vehicle, there is a license plate in the frame. When this occurs, the algorithm immediately looks for license plates in additional frames which are close to the timestamp of the frame in which a vehicle is initially detected. The algorithm retrieves frames from the buffer that are close to that timestamp. The frames thus obtained are aggregated.

The scan lines 36a-36d are the grabs of license plate frames that are buffered. Each scan line represents a frame that has a license plate and in which motion is detected. The first four scan lines 36a, for example, are the four frames that are used to identify the license plate.

Certain lines 38 show frames that do not contain a license plate. Embodiments of the invention conserve CPU time when these frames are encountered because the frames are not processed to identify characters. If this approach were not taken, then it would be necessary to process every frame encountered at the scanning phase. This approach skips those frames that would not yield a license plate. Accordingly, rather than wasting CPU time, the algorithm looks only at frames around the timestamp.

Probing occurs when the camera is looking for motion. The line 34 in the probing area indicates that there is a license plate; the related bands 30 represent frames in which a license plate is detected. The line 39 indicates that nothing was detected. This is a false positive. In such a case, the algorithm checks around the neighborhood to see whether there actually is an event that is worth considering.

Embodiments of the invention also use a probing algorithm to optimize overall compute resource usage for better precision and recall. Once the frames are aggregated, the license plate characters are detected, as described above in connection with FIG. 1.

Multiline Character Recognition

Figure 3:
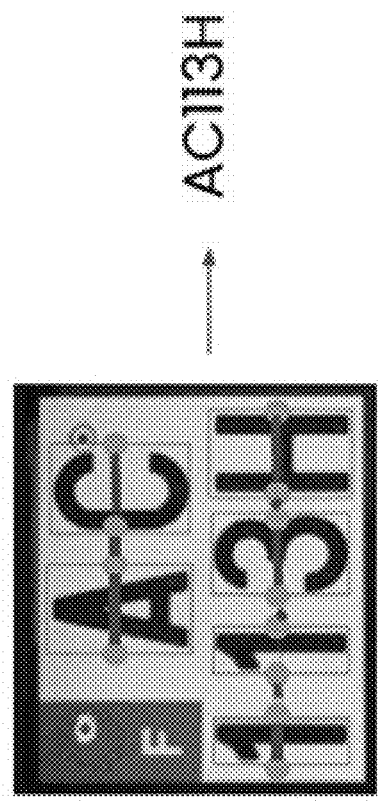
FIG. 3 shows multiline character recognition, in accordance with some embodiments.

FIG. 3 shows multiline character recognition, in accordance with some embodiments. Per the license plate character recognition scheme described above, the algorithm detects license plates and then detects characters within the license plates by identifying rectangles that comprise bounding boxes that contain characters with a high level of confidence.

The algorithm builds a graph of the detected bounding boxes. Nodes are defined relative to the centers of vertical sides of the detected bounding boxes.

Edges are drawn between nodes if:
The nodes belong to the same detection box;
The nodes have a minimum pairwise distance while maintaining the distance below a certain threshold;
All bounding boxes on the same line form a connected component of a graph; and
A depth-first search is used to identify the distinct components. A depth-first search (DFS) is an algorithm for traversing or searching tree or graph data structures. The algorithm starts at the root node (selecting some arbitrary node as the root node in the case of a graph) and explores as far as possible along each branch before backtracking.

In the case of multiline license plates, the output of the final machine learning model is not a string as described above but comprises a list of boxes. The algorithm then converts the list of boxes to a string as described above. Accordingly, embodiments of the invention build a computational graph out of detected bounding boxes.

In FIG. 3, the nodes of the graph are the centers of the vertical sides of the detected bounding boxes. If the nodes belong to the same box, they are connected, for example, as shown for the character "A" in FIG. 3. The algorithm checks the distances between each pair of nodes. If the distance is below a certain threshold, e.g., in embodiments typically one-half the height of the box, the algorithm joins the two points. In this way, adjacent boxes are joined.

Once the algorithm has identified the upper set of boxes (AC) by looking at the nodes and the spacing between the dots and likewise the lower set of boxes (113H), there are two sets of boxes that are linked to each other. The algorithm then uses a first come, first served algorithm to identify which of the boxes are connected. There are two components in each box. The algorithm begins by examining the boxes by their Y coordinates and reads them from top to bottom. Embodiments of the invention comprise two levels, looking at the components from top to bottom and then within each component from left to right.

A second search starts on the top set of boxes, which contain AC, and proceeds to the bottom set of boxes, which contain 113H. That is, looking left to right, the algorithm detects the boxes that contain AC and then, looking down and proceeding left to right, the algorithm sees the boxes that contain 113H.

The final output string is determined as described above by the aggregation algorithm. Thus, aggregation does not concern the boxes, only the text within the boxes. The text that is produced from the algorithm for each frame is combined to produce the resultant string, i.e., AC113H.

Stacked Character Recognition

Figure 4:
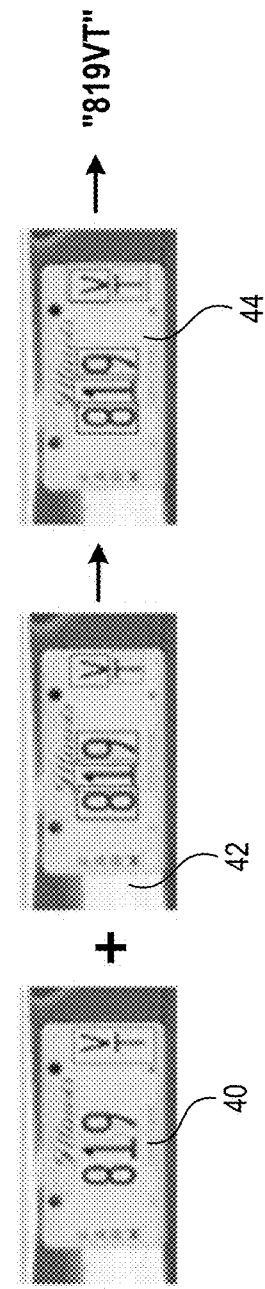
FIG. 4 shows stacked character recognition, in accordance with some embodiments.

FIG. 4 shows stacked character recognition, in accordance with some embodiments. In embodiments of the invention, an extra class is provided for the stacked character region. The algorithm detects characters of all sizes in the stacked character region. In embodiments of the invention there are 36 classes. The algorithm finds the stacked characters that intersect the detected stacked character region. The characters in the stacked character region are sorted vertically. All other characters, including those in the stacked character region, are then sorted horizontally.

As shown in FIG. 4, a first step detects the stacked character region 40 (1 Class). The algorithm then simultaneously detects characters of all sizes 42 (35 Classes). Thereafter, a final OCR object detection 44 is made and the final OCR string, i.e., 819VT, is output.

In this embodiment of the invention, there is an extra character referred to herein as the stacked character region. The detection model is trained for this particular use case, i.e., the model is also trained to detect a special region that contains stacked characters. In the embodiments above there are 36 classes. This embodiment has 37 classes, where the extra class is for the stacked character region. The model is trained to detect the stacked character region. Accordingly, the model yields a box for the 8, 1, 9. The model yields three boxes in the region where the V and T are, i.e., it first yields one large box and then two smaller boxes within the larger box, one box for the V and one box for the T. The algorithm then reads the boxes. The algorithm finds an intersection of each of the boxes with one another. It finds the intersection of the smaller box with the bigger box. The boxes that contain the V and T have a high intersection, such as 90% of one box is contained in the other box. The model determines where the start character region is for the stacked characters that are not connected with the other three characters 8, 1, 9.

There is a standardization of all boxes with each other. If the intersection is at a certain height, then that box is the start character region box. If there is no start character region box, then an intersection is not determined. When any box intersects adequately with a box in the adjacent region, that box is a start character box, and it is discarded from the process of reading from left to right. The model then starts reading from the left. The 8, 1, and 9 are in the start character region. It is already known which of the boxes are within that region. Based on the intersection method, instead of starting on the X axis and reading from left to right, the model starts on the Y axis and reads from top to bottom, reading the character V and then the character T.

The model initially yields six boxes. Five of the boxes are actual characters that are read from left to right and the sixth box is the stacked character region which is not read from left to right. Rather, the stacked region box is read from top to bottom. The final step is to link the characters read in the stacked region to those previously read.

To avoid false detection, the model automatically learns to detect certain regions. The model is trained to look for characters of a certain proportion or a certain size and it ignores other characters, e.g., I l l i n o i s.

Flowcharts 5-6

Figure 5A:
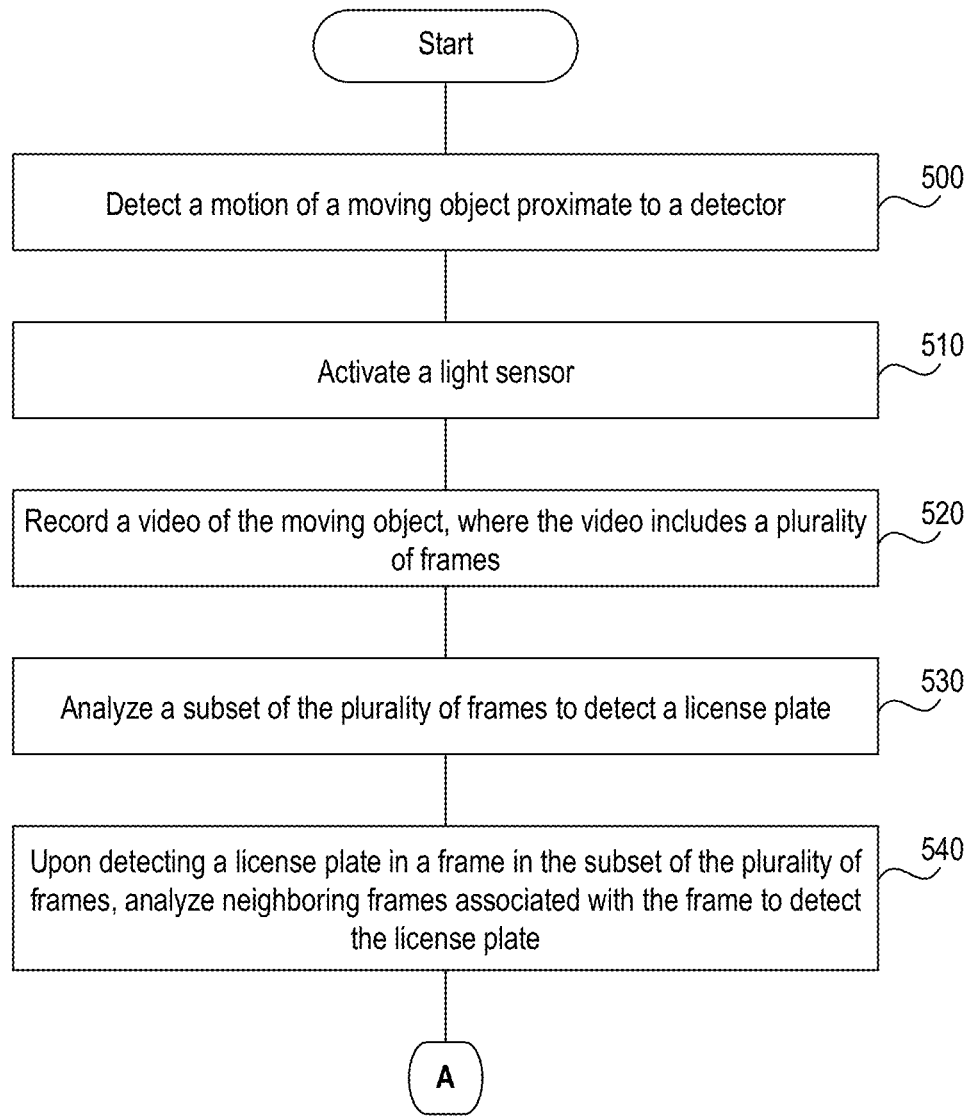
FIGS. 5A-5B show a flowchart of a method to detect and read a license plate.
Figure 5B:
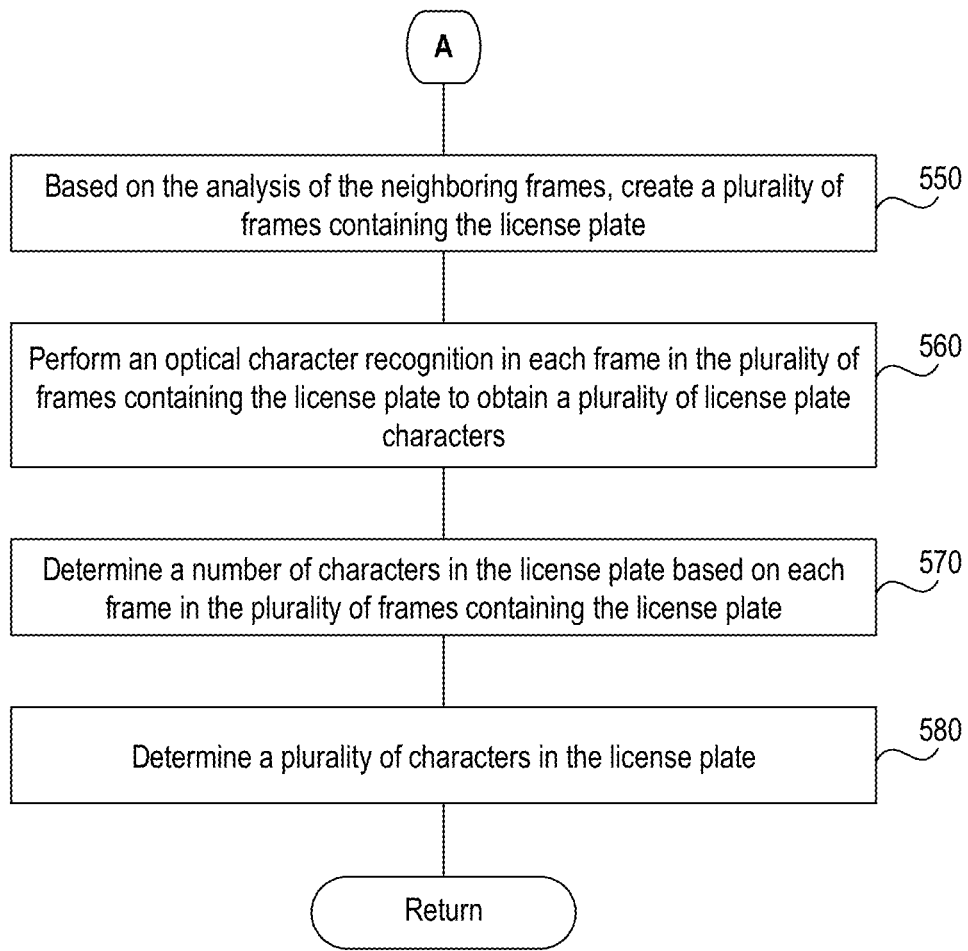

FIGS. 5A-5B show a flowchart of a method to detect and read a license plate. In step 500, a hardware or software processor executing instructions described in this application can detect a motion of a moving object proximate to a detector, such as a laser detector.

In step 510, the processor, upon detecting the motion, can activate a light sensor, such as a camera. The light sensor can be configured to reduce energy consumption by remaining inactive until the motion is detected.

In step 520, the light sensor can record a video of the moving object, where the video includes multiple frames recorded at a predetermined frame rate, between 1 frame per second and 30 frames per second.

In step 530, the processor can analyze a subset of the multiple frames to detect a license plate. For example, the processor can analyze every second, third, fourth, fifth, etc., frame among the multiple frames to detect the license plate.

In step 540, upon detecting a license plate in a frame in the subset of the multiple frames, analyze neighboring frames associated with the frame to detect the license plate, where the neighboring frames temporally precede and succeed the frame. For example, the processor can analyze immediately neighboring frames first, such as the immediately preceding frame and the immediately succeeding frame, for the license plate. If the processor detects a license plate in the immediately preceding and immediately succeeding frames, the processor can continue to the next immediately preceding and the next immediately succeeding frames. The processor can terminate the search of the neighboring frames when no license plate is detected in the preceding and/or succeeding frames.

In step 550, based on the analysis of the neighboring frames, the processor can create and/or aggregate multiple frames containing the license plate.

In step 560, the processor can perform an OCR operation in each frame among the multiple frames containing the license plate to obtain multiple license plate characters. To perform the OCR, the processor can obtain multiple bounding boxes indicating location of the multiple characters in the license plate. The processor can obtain among the multiple bounding boxes from a machine learning model trained to detect characters and produce bounding boxes. The processor can represent each box among the multiple boxes by a node to obtain multiple nodes. The location of the node can indicate a location of the box among the multiple boxes. The location of the box can be represented by Cartesian coordinates, such as X, Y coordinates. The processor can determine a distance between a first node among the multiple nodes and a second node among the multiple nodes based on a first location of the first node and a second location of the second node. The first location of the first node can be represented by first Cartesian coordinates, and the second location of the second node can be represented by second Cartesian coordinates. The processor can determine whether the distance is below a predetermined threshold, which can be computed based on a length of a long side of the box. For example, the predetermined threshold can be half of the length of the long side of the box. Upon determining that the distance is below the predetermined threshold, the processor can create a first edge between the first node and the second node, thereby obtaining a graph including the first node, the second node, and the first edge. Based on the first Cartesian coordinates and the second Cartesian coordinates, the processor can determine a leftmost node in the graph. In one embodiment, the processor can order the multiple characters into a sequence of characters based on the graph and the leftmost node in the graph. For example, the processor can determine the longest linear chain starting at the leftmost node in the graph. The linear chain follows only a single path from a single node, thus giving an ordering of the nodes and, consequently, an ordering of the characters in the linear chain. The ordering of the characters in the linear chain can become the sequence of characters in the license plate.

In step 570, the processor can determine a number of characters in the license plate based on each frame among the multiple frames containing the license plate. To determine the number of characters, the processor can determine a number of characters in each frame among the multiple frames containing the license plate to obtain a multiple numbers of characters. The processor can determine a most frequent number of characters among the multiple numbers of characters in multiple frames. The processor can determine whether one or more frames among the multiple frames containing the license plate contain one or more numbers of characters different from the most frequent number of characters. Upon determining that the one or more frames among the multiple frames containing the license plate contain one or more numbers of characters different from the most frequent number of characters, the processor can discard the one or more frames.

In step 580, the processor can determine multiple characters in the license plate by performing the following steps for each character among the multiple characters. The processor can determine a location of a character among the multiple characters, such as whether the character is first, second, third, etc., in the sequence of characters. Based on the location of the character among the multiple characters, the processor can determine corresponding characters in each frame among the multiple frames containing the license plate, wherein the corresponding characters in each frame of the characters have the same position as the character. For example, if the character is the first character in the frame, all the corresponding characters are first characters in their frames. If the character is in the fourth position in the frame, all the corresponding characters are in the fourth position in their frames. The processor can determine a most frequent character occurring among the character and the corresponding characters. For example, the multiple frames can contain 10 frames. In the second position among the 10 frames, 7 of the frames can have the character "O," while 2 of the frames can have the character "Q" and 1 frame can have the character "G." Consequently, the processor can determine that the character "O" has the greatest confidence value. The processor can determine the most frequent character, namely the character "R," to be part of the multiple characters in the license plate, and the processor can select the character "O" to be in the second position.

In one embodiment, to determine the sequence of characters, the processor can obtain multiple bounding boxes indicating location of the multiple characters in the license plate. The processor can represent each box among the multiple boxes by a node to obtain multiple nodes, where a location of the node indicates a location of the box among the multiple boxes. The location of the box can be represented by Cartesian coordinates. The processor can determine a distance between a first node among the multiple nodes and a second node among the multiple nodes based on a first location of the first node and a second location of the second node, where the first location of the first node and the second location of the second node are represented by first and second Cartesian coordinates, respectively. The processor can determine whether the distance is below a predetermined threshold, where the predetermined threshold is computed based on a length of a long side of the box. Upon determining that the distance is below the predetermined threshold, the processor can create a first edge between the first node and the second node, thereby obtaining a first graph including the first node, the second node, and the first edge.

The processor can determine whether a second graph disconnected from the first graph exists, where the second graph includes a third node not connected to the first graph via a second edge, where the third node includes third Cartesian coordinates. Upon determining that the second graph exists, based on the first Cartesian coordinates, the second Cartesian coordinates, and the third Cartesian coordinates, the processor can determine an ordering of the first graph and the second graph. The processor can order the first graph and the second graph based on the X or Y coordinate values of the nodes in each graph. The X or Y coordinate values can be the average X or Y value for all the nodes in a graph, or the X or Y coordinate value can be the highest X or Y coordinate of a node in a graph. The user can indicate the ordering. In some cases, the user can indicate the ordering to be from left to right, in which case the processor orders the graph based on the X coordinates. In other cases, the user can indicate the ordering to be from top to bottom, in which case the processor orders the graph based on the Y coordinates. The processor can order the multiple characters into a sequence of characters based on the ordering of the first graph and the second graph. For example, the processor can include the characters in the first graph initially, followed by the characters in the second graph.

In one embodiment, to determine the sequence of characters, the processor can obtain multiple bounding boxes indicating location of the multiple characters in the license plate. The processor can represent each box among the multiple boxes by a node to obtain multiple nodes, where a location of the node indicates a location of the box among the multiple boxes. The processor can determine a distance between a first node among the multiple nodes and a second node among the multiple nodes based on a first location of the first node and a second location of the second node. The processor can determine whether the distance is below a predetermined threshold, where the predetermined threshold is computed based on a length of a long side of the box. Upon determining that the distance is below the predetermined threshold, the processor can create a first edge between the first node and the second node, thereby obtaining a first graph including the first node, the second node, and the first edge. The processor can determine whether a second graph disconnected from the first graph exists, where the second graph includes a third node not connected to the first graph via a second edge.

The processor can receive an indication of how to order the first graph and the second graph. For example, the indication can be a textual explanation indicating whether to order the graphs based on X, Y, or Z coordinates. If there are more than two graphs, the processor can order the graphs in multiple passes. In the initial ordering, the processor can order the first graph and the second graph based on the X coordinate, and then in the second ordering, the processor can order the group of the first graph, the second graph, and the third graph based on the Y coordinate.

Upon determining that the second graph exists, based on the indication of how to order the first graph and the second graph, the processor can determine an ordering of the first graph and the second graph. The processor can order the multiple characters into a sequence of characters based on the ordering of the first graph and the second graph. For example, the characters contained in the first graph contain the initial characters in the license plate, followed by the characters contained in the second graph.

The processor can train a machine learning model to detect the character having a predetermined proportion or a predetermined size, and can train the machine learning model to produce a bounding box associated with the character. For example, the model can automatically learn to detect certain regions, and characters of a certain proportion or a certain size, while ignoring other characters.

The light sensor can operate at varying frame rates that vary based on the speed of the moving object whose license plate needs to be detected. To adjust the frame rate of the light sensor, the processor can detect, by the detector, a velocity of the moving object. Upon detecting the motion, the processor can activate the light sensor, which can be configured to record the video at an adjustable frame rate. Based on the velocity, the processor can adjust the frame rate associated with the light sensor, where a high velocity causes a first frame rate associated with a camera, where a low velocity causes a second frame rate associated with the camera, and where the first frame rate is higher than the second frame rate. Low velocity can be a velocity up to and including 10 mph. The first frame rate can be 2 frames per second. As the velocity increases, the frame rate can increase in proportion to the velocity. For example, if the velocity reaches 20 mph, the frame rate can be 4 frames per second. The processor can record a video of the moving object at the adjusted frame rate.

Figure 6A:
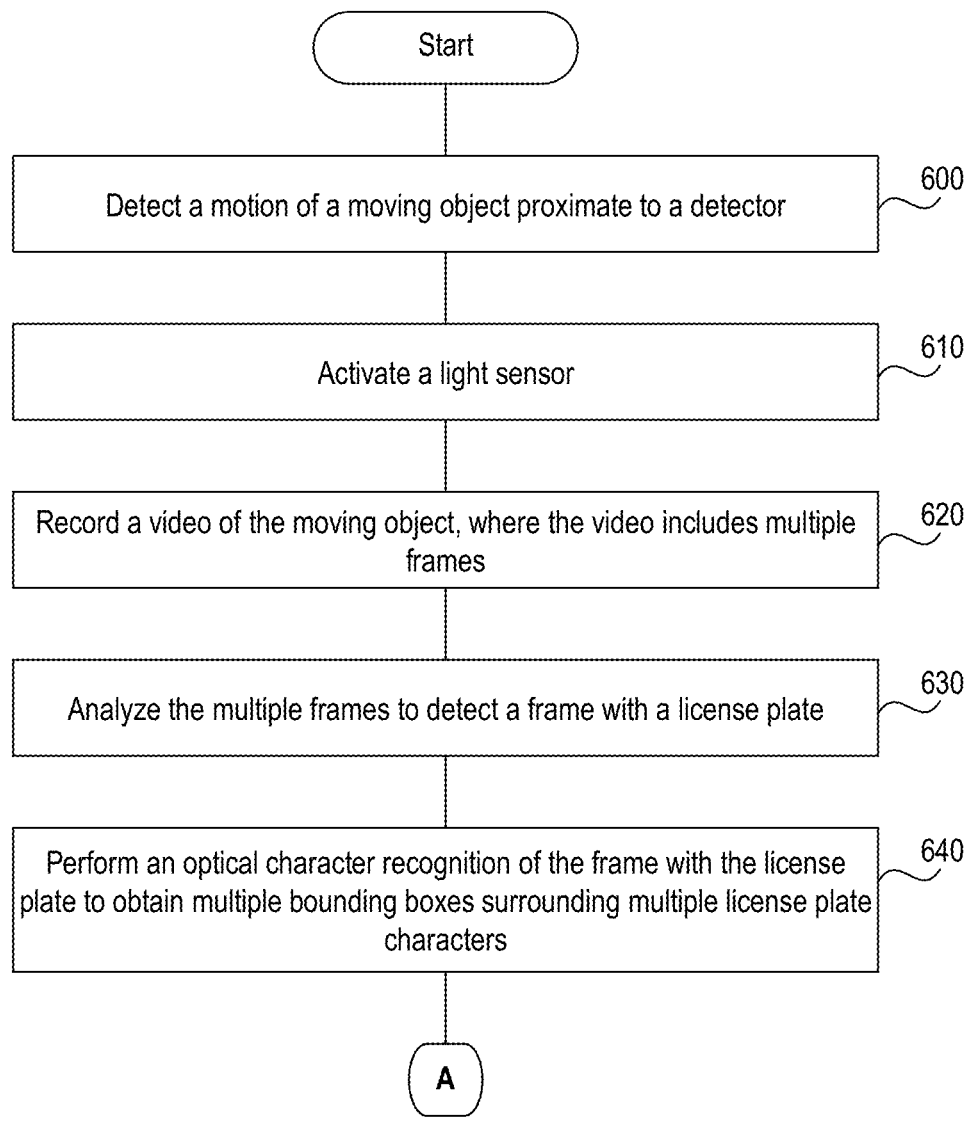
FIGS. 6A-6B show a flowchart of a method to detect and read a license plate when at least a portion of the characters in the license plate are stacked vertically.
Figure 6B:
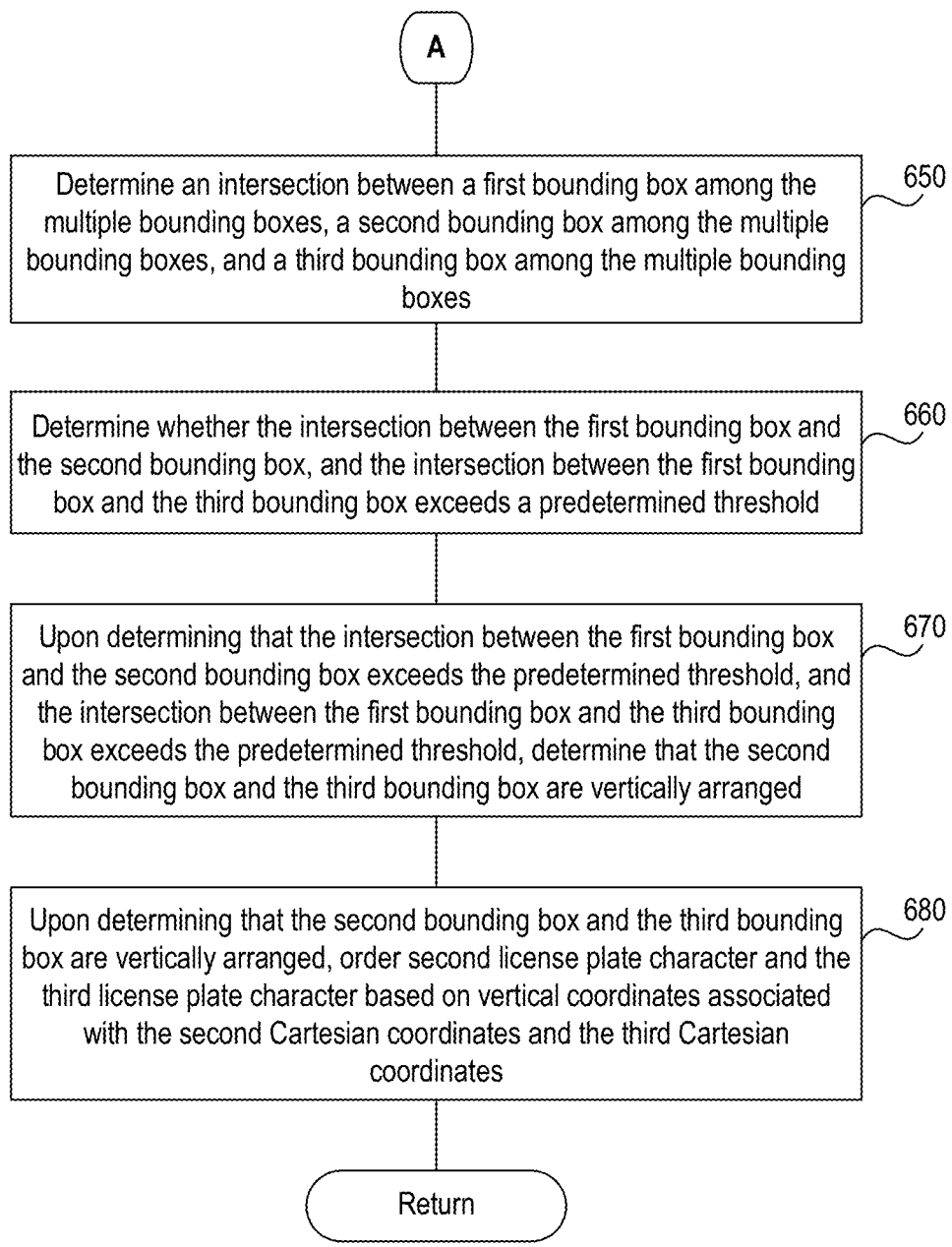

FIGS. 6A-6B show a flowchart of a method to detect and read a license plate when at least a portion of the characters in the license plate are stacked vertically. In step 600, the processor can detect a motion of a moving object proximate to a detector. In step 610, the processor can activate a light sensor. In step 620, the processor can record a video of the moving object, where the video includes multiple frames.

In step 630, the processor can analyze of the multiple frames to detect a frame with a license plate. In step 640, the processor can perform an OCR operation of the frame with the license plate to obtain multiple bounding boxes surrounding multiple license plate characters, wherein a bounding box among the multiple bounding boxes includes Cartesian coordinates indicating a location of the bounding box.

In step 650, the processor can determine an intersection between a first bounding box among the multiple bounding boxes, a second bounding box among the multiple bounding boxes, and a third bounding box among the multiple bounding boxes. The second bounding box can include a second license plate character, the third bounding box includes a third license plate character. The second bounding box can include second Cartesian coordinates, and the third bounding box can include third Cartesian coordinates.

In step 660, the processor can determine whether the intersection between the first bounding box and the second bounding box, and the intersection between the first bounding box and the third bounding box exceeds a predetermined threshold, such as 90% of the second and the third bounding box are contained in the first bounding box. In step 670, upon determining that the intersection between the first bounding box and the second bounding box exceeds the predetermined threshold, and the intersection between the first bounding box and the third bounding box exceeds a predetermined threshold, the processor can determine that the second bounding box and the third bounding box are vertically arranged.

In step 680, upon determining that the second bounding box and the third bounding box are vertically arranged, the processor can order second license plate character and the third license plate character based on vertical coordinates associated with the second Cartesian coordinates and the third Cartesian coordinates.

Augmented Operation

Some embodiments may perform other operations that take advantage of hardware-augmented computer vision algorithms. In many cases, the use of a vision processor having specialized circuitry to perform computer vision operations may enable the use of alternative solutions that can enhance license plate tracking or other tracking in real time and real world environments.

Figure 7:
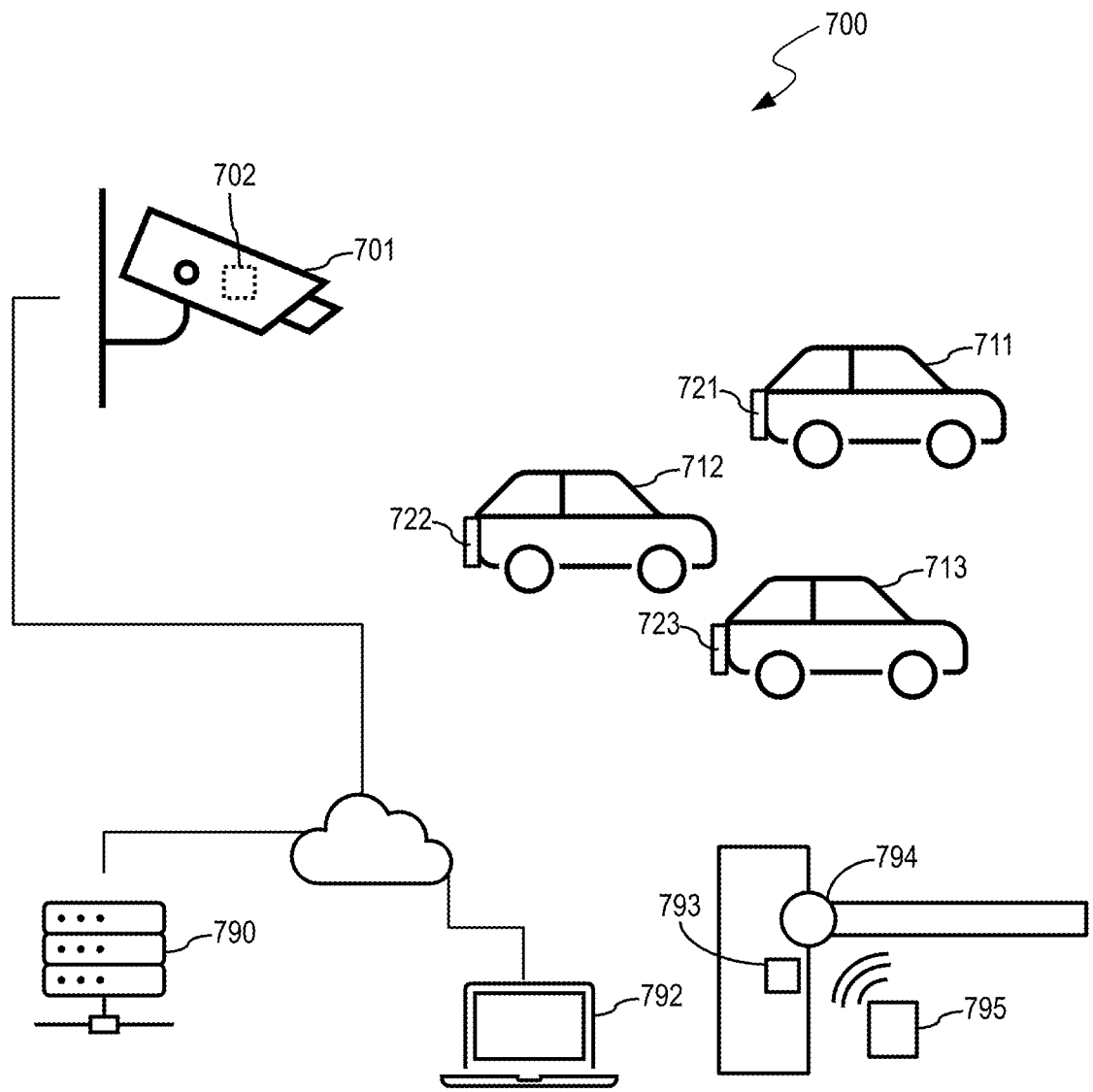
FIG. 7 depicts a tracking system to detect and distinguish multiple spatiotemporal objects, in accordance with some embodiments.

FIG. 7 depicts a tracking system to detect and distinguish multiple spatiotemporal objects, in accordance with some embodiments. A system 700 includes a camera device 701 that is augmented with a VPU 702. As used in this disclosure, a VPU may be distinguished from a general-use CPU by including a direct interface to take data from a set of image sensors without requiring the use of a system bus (e.g., including a direct pipeline to receive data from one or more image sensors). A VPU may also include chip architecture optimized for parallel computation using two-dimensional arrays as inputs (e.g., an architecture of a parallel vector processor), and may include proportionally greater amounts of multi-threading hardware for massively parallel operations. A VPU may include a significantly greater number of high-efficiency integer computing units that target the processing of 16-bit data types instead of 32-bit data types that are superior for computer vision operations. For example, the VPU 702 may include a direct interface with an image sensor (bypassing a processor bus) configured such that the majority of the integer hardware is configured for 8-bit data types or 16-bit data types in contrast to 32-bit data types, and the VPU 702 may further include a multi-threading hardware module.

The camera device 701 may obtain a video stream of a first vehicle 711, a second vehicle 712, and a third vehicle 713. The first vehicle 711 has a first license plate 721, the second vehicle 712 has a second license plate 722, and the third vehicle 713 has a third license plate 723. The video stream may include a sequence of frames ("frame sequence"), where the frame sequence may include frames that depict the first vehicle 711, the first license plate 721 attached to the first vehicle 711, the second vehicle 712, the second license plate 722 attached to the second vehicle 712, the third vehicle 713, and the third license plate 723 attached to the third vehicle 713.

The camera device 701 may use the VPU 702 to generate multiple spatiotemporal tracklets (i.e., tracklet). The camera device 701 may perform operations described in this disclosure to generate a set of tracklets. For example, as the camera device 701 records a video stream capturing the motion of the first vehicle 711, the camera device 701 may use the VPU 702 and other components of the camera device 701 to perform a set of tracking operations. The set of tracking operations may include pre-processing the video stream, detecting the presence of the first license plate 721 in a frame of the video stream, generating a bounding box to surround the first license plate 721 in the frame, performing OCR on a sub-image surrounded by the bounding box to detect a set of characters, and updating a tracklet to include the bounding box of the frame.

In some embodiments, the camera device 701 may use the VPU 702 and other components of the camera device 701 to concurrently detect and form bounding boxes for multiple license plates. For example, the camera device 701 may generate a first bounding box surrounding an image of a frame for the first license plate 721, a second bounding box surrounding the image of the frame for the second license plate 722, and a third bounding box surrounding the image of the frame for the third license plate 723. The camera device 701 may then, as a part of the set of tracking operations, concurrently update a first tracklet to include the first bounding box, update a second tracklet to include the second bounding box, and update a third tracklet to include the third bounding box. As described elsewhere in this disclosure, updating a tracklet based on a bounding box may include performing an intersection over union (IoU) algorithm based on a pair of bounding boxes or computing an edit distance between character sequences associated with the pair of bounding boxes.

In some embodiments, the camera device 701 may perform the set of tracking operations in real-time. Real-time tracking may include tracking operations that update a tracklet with another bounding box of a new frame within a predefined duration, where the predefined duration may be less than 1 millisecond, less than 10 milliseconds, less than 100 milliseconds, or less than 1000 milliseconds.

In some embodiments, the camera device 701 may send a video stream, results of one or more operations, or other data to a server 790 via a network 750. For example, the camera device 701 may send a video stream depicting the first vehicle 711, the second vehicle 712, and the third vehicle 713 to the server 790. The camera device 701 may also send tracklet data to the server 790. A client computing device 792 may connect to the server 790 to receive the video stream recorded by the camera device 701 and further receive data indicating the tracklets identifying the first vehicle 711, the second vehicle 712, and the third vehicle 713. Furthermore, it should be understood that while only one client computing device is depicted in the system 700, some embodiments may provide video stream data, tracklet data, or other data described in this disclosure to a plurality of client computing devices.

By using the camera device 701 to perform real-time object recognition and character recognition operations instead of relying on cloud computing systems, the camera device 701 may operate in low-bandwidth or even no-bandwidth environments. Instead of being required to convey high-resolution image data to a server in order for the server to perform computer vision operations, the camera device 701 may provide, to the server, a low-resolution video stream and results of camera-determined computer vision operations. Thus, using the camera device 701 may require less than 50%, less than 25%, or even less than 10% of the bandwidth needed to perform tracking operations in contrast to cameras that rely on server-side computer vision operations. Furthermore, the camera device 701 may provide higher-resolution sub-images of portions of a frame surrounded by a tracklet bounding box to a server without providing higher-resolution images of the frame to the server.

In some embodiments, the client computing device 792 may receive video data and results of tracking operations from the camera device 701. For example, the camera device 701 may send tracklet data and a compressed video stream recording the first vehicle 711, second vehicle 712, and third vehicle 713 to the client computing device 792 via the network 750 and the server 790. Alternatively, or additionally, the camera device 701 may send data to the client computing device 792 via the network 750 without sending the data to the server 790. The video data may include high-resolution video stream data, such as video stream data having resolutions greater than (((RESOLUTION-VALUE1))), greater than (((RESOLUTIONVALUE2))), or greater than some other threshold indicating a high-resolution video stream. Alternatively, or additionally, the client computing device 792 may receive a low-resolution video stream that requires less bandwidth or other network resources to transfer from the camera device 701 to the client computing device 792. Furthermore, the client computing device 792 may concurrently receive different video streams from the camera device 701. For example, the camera device 701 may provide a reduced-resolution video stream of a wider area and a higher resolution video stream of a portion of the lower resolution video stream that has been dilated to enhance the image in that portion, such as a video stream of a dilated region surrounded by a bounding box. The camera device 701 may also perform additional tracking operations and send the results of these tracking operations to the client computing device 792. For example, the camera device 701 may send a set of tracklets to the client computing device 792. Sending a tracklet may include sending information characterizing a bounding box of the tracklet and an identifier of the tracklet that may be used to associate the bounding box with other bounding boxes of the tracklet. In some embodiments, the client computing device 792 may visually display one or more video streams sent to the client computing device 792, dilated higher resolution portions of the video stream(s) sent to the client computing device 792, bounding boxes of one or more tracklets, trailing trajectories of the tracklets, etc.

In some embodiments, the camera device 701 may control the actuator 794 of an entryway device or another device. For example, the camera device 701 may be configured to send an activation signal to the actuator 794 in response to recognizing that a recognized sequence of characters of the first license plate 721 matches one of a list of permitted license plate character sequences. Furthermore, the character device may send a second signal to the actuator 794 in response to detecting that the first vehicle 711 has passed through a predetermined area, exited from a predetermined area, or entered a predetermined area.

Alternatively, or additionally, the camera device 701 may activate other operations, that may result in an update of a related record accessible via the server 790. Furthermore, some embodiments may actuate the actuator 794 in response to receiving a target character sequence from the camera device 701 and receiving a wireless signal at a wireless signal receiver. For example, in some embodiments, the actuator 794 may further require that a wireless signal receiver 793 receives wireless signals from the card 795. Furthermore, some embodiments may use information provided by the camera device 701 for starting or stopping a tolling operation. For example, some embodiments may determine that a transaction amount stored in a record associated with a license plate should be updated to increase the transaction amount to be tolled in response to a detection of a specific sequence of strings of a detected license plate. Alternatively, or additionally, some embodiments may notify one or more entities that a target vehicle having a target license plate character sequence has entered a region, notify one or more entities that a vehicle not having one or more registered license plate character sequences is parked in an area, detect that a target license plate has been found, etc.

Figure 8:
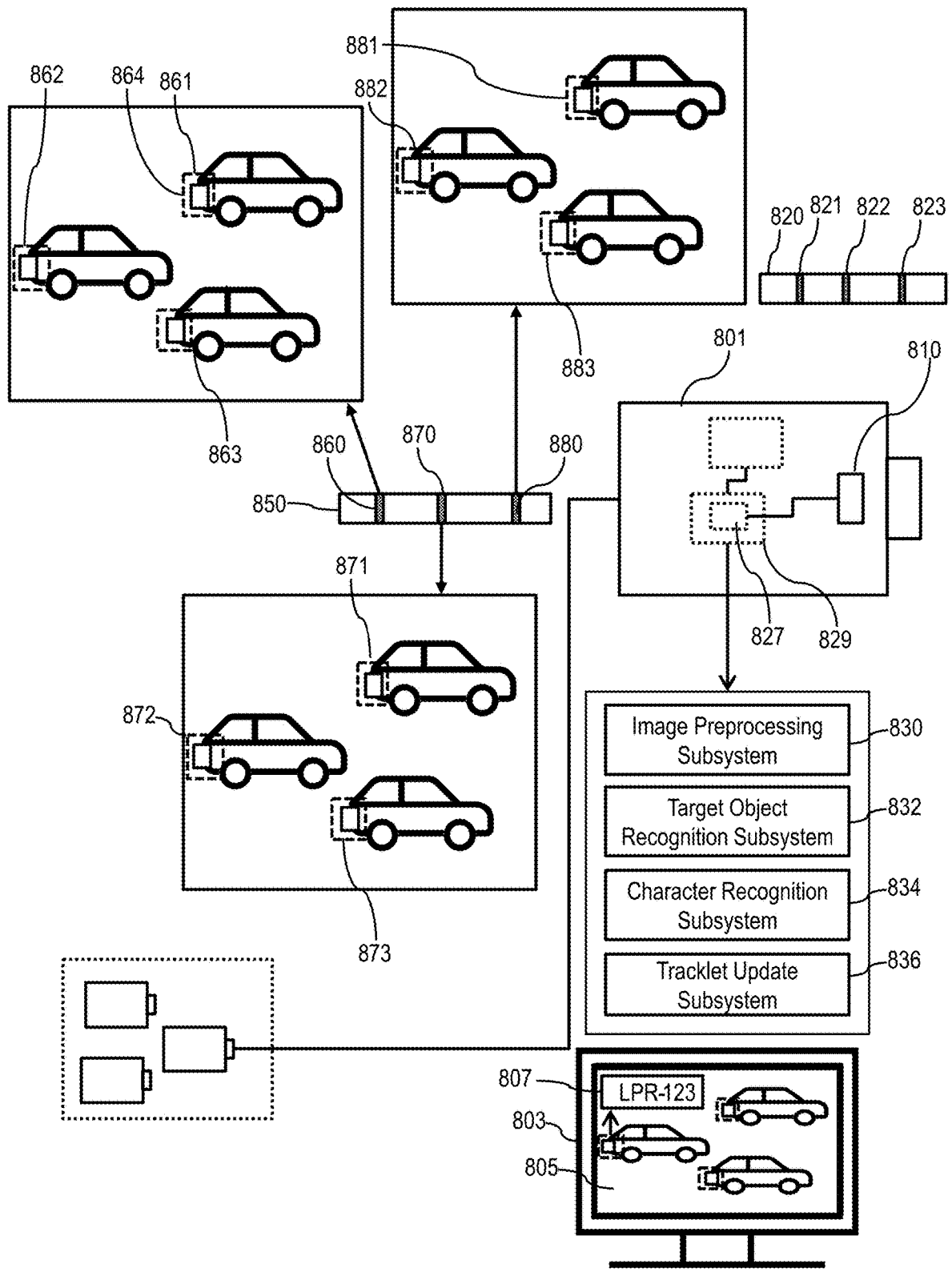
FIG. 8 depicts an example workflow for generating tracklets using a multi-object detection camera device, in accordance with some embodiments.

FIG. 8 depicts an example workflow for generating tracklets using a multi-object detection camera device, in accordance with some embodiments. The camera device 801 includes a set of image sensors 810, where the set of image sensors 810 may record a video stream 820. The video stream 820 may include a first frame 821, a second frame 822, and a third frame 823. Some embodiments may provide the frames 821-823 to a set of processors 829 of the camera device 801, which may execute an image preprocessing subsystem 830 to perform an initial set of preprocessing operations. The preprocessing operations may include image translation, image scaling, image rotation, color conversions, etc. The image preprocessing subsystem 830 outputs a set of preprocessed frames 850 to a target object recognition subsystem 832, where the set of preprocessed frames 850 includes a first frame 860, a second frame 870, and a third frame 880. In some embodiments, the preprocessed frames 850 may be consecutively ordered such that the first frame 860 is recorded right before the second frame 870, and the second frame 870 may be recorded right before the third frame 880.

The target object recognition subsystem 832 may determine bounding boxes for each frame of the set of preprocessed frames 850. For example, the target object recognition subsystem 832 may determine a first bounding box 861, a second bounding box 862, and a third bounding box 863 based on the first frame 860, where the target object recognition subsystem 832 may use a VPU 827 of the processors 829. In some embodiments, the VPU 827 may directly receive, at a port of the VPU 827, image data from the image sensors 810 instead of receiving the image data via a system bus. Some embodiments may use the target object recognition subsystem 832 to determine a fourth bounding box 871, a fifth bounding box 872, and a sixth bounding box 873 based on the second frame 870. Some embodiments may use the target object recognition subsystem 832 to determine a seventh bounding box 881, an eighth bounding box 882, and a ninth bounding box 883 based on the third frame 880. Furthermore, it should be understood that some embodiments may process a frame to detect some other number of bounding boxes. For example, some embodiments may generate at least two bounding boxes based on a frame, generate at least three bounding boxes based on a frame, etc.

In some embodiments, the target object recognition subsystem 832 may directly detect the presence of a target object, such as a license plate, and then determine an initial bounding box around the target object. For example, the target object recognition subsystem 832 may include a convolutional neural network (CNN) model, use the CNN model to detect the presence of a license plate 864 in the first frame 860, and generate the first bounding box 861 based on the detection of the license plate 864. Some embodiments may then transform a sub-image bounded by the initial bounding box by performing resizing operations, performing translation operations, performing rotation operations, performing color conversion operations, or performing other types of image transformation operations.

Alternatively, or additionally, the target object recognition subsystem 832 may implement a hierarchical image tracking operation. For example, the target object recognition subsystem 832 may detect the presence of a vehicle using a first CNN trained to detect vehicles and generate an intermediate bounding box surrounding the detected vehicle. The target object recognition subsystem 832 may then use a second CNN trained to detect license plates to detect a license plate within the intermediate bounding box. Some embodiments may concurrently use both hierarchical tracking operations and direct tracking operations to detect different types of target objects.

The character recognition subsystem 834 may perform character recognition operations to obtain one or more characters based on bounding boxes generated by the target object recognition subsystem 832. For example, some embodiments may examine the image within the first bounding box 861 to detect the characters "LPR 123" using character recognition operations, such as character recognition operations described elsewhere in this disclosure. Some embodiments may use the VPU 827 when performing character recognition operations. Alternatively, or additionally, some embodiments may use a general processor or graphics processing unit (GPU) to perform character recognition operations. Some embodiments may then store the recognized characters in association with the bounding box bounding the image region that the recognized characters are generated from. For example, after detecting the character sequence "LPR 123" from the first bounding box 861, some embodiments may associate "LPR 123" with the first bounding box 861 in a memory 811 of the camera device 801, as described elsewhere in this disclosure. Furthermore, some embodiments may associate "LPR 123" with the tracklet comprising the first bounding box 861 or otherwise indicating the first bounding box 861, as disclosed elsewhere in this disclosure.

When processing the first frame 860, second frame 870, and third frame 880, some embodiments may provide their respective bounding boxes to a tracklet update subsystem 836. As used in this disclosure, a tracklet may refer to a data object that includes, indicates, or is otherwise mapped to a set of coordinates representing positions or regions in an image space of a video stream over time. For example, a tracklet may include a series of bounding boxes, where the bounding box may otherwise include a border of a target object or a portion of the target object. While some embodiments may store or otherwise indicate a bounding box to be a rectangular region, other types of bounding boxes may include other shapes, such as a diamond, another polygon, another type of geometric shape, an amorphous shape, etc.

The tracklet update subsystem 836 may use various types of algorithms to associate the set of bounding boxes over different frames to generate a tracklet associating the set of bounding boxes with each other. Some embodiments may associate a set of bounding boxes with each other by using an IoU algorithm. For example, the tracklet update subsystem 836 may associate the first bounding box 861 and the fourth bounding box 871 with each other based on a first IoU ratio of the first bounding box 861 and the fourth bounding box 871. The 836 may further associate the fourth bounding box 871 and the seventh bounding box 881 with each other based on a second IoU ratio of the fourth bounding box 871 and the seventh bounding box 881. Some embodiments may further associate the character sequence of the first bounding box 861, the fourth bounding box 871, and the seventh bounding box 881 with the tracklet. Some embodiments may first harmonize discrepancies in detected character sequences to form an aggregate character sequence before associating the aggregate character sequence with the tracklet.

Alternatively, or additionally, some embodiments may associate bounding boxes from different frames based on characters recognized from those associated bounding boxes. For example, some embodiments may use an OCR algorithm on a sub-image surrounded by a first bounding box of a first frame to generate a first character sequence "XYZ-123" based on a sub-image bound in the second bounding box 862 and use of the OCR algorithm on a sub-image bound by the fifth bounding box 872 to generate a second character sequence "XYZ-128." Some embodiments determine a difference (e.g., Levenstein's edit distance) between the first and second character sequences and determine whether the bounding boxes are part of a same tracklet based on the difference. For example, if the edit distance is less or equal to an edit distance threshold, some embodiments may determine that the second bounding box 862 and the fifth bounding box 872 are part of the same tracklet.

Some embodiments may use a combination of different techniques to associate bounding boxes between different frames. For example, some embodiments may use an IoU method to determine a first likelihood that the third bounding box 863 and the sixth bounding box 873 are part of the same tracklet, use an edit distance of character sequences associated with this same pair of bounding boxes to determine a second likelihood that the pair of bounding boxes are part of the same tracklet, and combine this first likelihood with the second likelihood with equal or unequal weights to determine a combined likelihood. Based on a determination that the combined likelihood satisfies a threshold, some embodiments may determine that the pair of bounding boxes are part of a same tracklet.

As described elsewhere, some embodiments may store character sequence information in association with images in a data store for later training operations to train one or more machine learning models described in this disclosure. Some embodiments may perform operations to anonymize or otherwise obfuscate this stored character information or other information to preserve the privacy of entities. For example, some embodiments may randomly or pseudo-randomly select a character in a character sequence and then blur out the selected character in one or more frames of a video stream. Some embodiments may then send the video stream to a remote data store via a network connection. Some embodiments may then use the video stream having the set of modified images for training operations.

Some embodiments may use the VPU 827 to perform some or all of the operations of the image preprocessing subsystem 830, target object recognition subsystem 832, character recognition subsystem 834, or tracklet update subsystem 836. For example, some embodiments use the VPU 827 to perform rescaling and recoloring operations of the image preprocessing subsystem 830 and then license plate recognition operations of the target object recognition subsystem 832. Some embodiments may concurrently perform object recognition operations in real time such that the VPU 827 may generate bounding boxes in real-time with respect to a recording rate. For example, if the image sensors 810 is collecting and storing the video stream 820 at a rate of 20 frames per second (fps), the VP may generate bounding boxes at a rate that is greater than or equal to 20 times per second. The combined operations of preprocessing a frame, detecting a target object, generating a bounding box for a detected target object, recognizing characters in the bounding box, and updating a tracklet by associating the bounding box and its associated characters with a tracklet may be considered a set of tracking operations of the tracklet. By using a VPU, some embodiments use the camera device 801 to perform concurrent tracking operations of multiple tracklets in real-time.

Some embodiments may store a recording of the video stream captured by the image sensors 810 in a set of non-transitory, machine-readable media 811. Some embodiments may apply compression algorithms to the video stream before transmitting a compressed version of the video stream to a server or client computing device. Alternatively, or additionally, some embodiments may perform other operations to reduce a network resource requirement to transfer the video stream. Some embodiments may compress a version of the video stream into a reduced-resolution form to further reduce the amount of data to transfer from the camera device 801 to a server or client computing device, such as a client computing device 803. For example, the camera device 801 may perform operations to reduce an 8K video stream having a resolution of 7680×4320 pixels into a 720p video stream having a resolution of 720×1280 pixels before compressing the 720p video stream for transfer to client computing device. The camera device 801 may further send tracklets, including the bounding boxes 861-869, to the client computing device 803. The client computing device 803 may then display, on a user interface 805 of the client computing device 803, a reduced-resolution version of the video stream 820 and a visual representation of the bounding boxes of tracklets, where the region 807 represents a higher-resolution version of the video stream 820 restricted to the image region surrounded by the second bounding box 862.

Some embodiments may maintain portions of a video stream with a higher resolution for transfer while reducing the resolution of the video stream. For example, the camera device 801 may reduce the resolution of the video stream 820 to generate a reduced-resolution video stream. The camera device 801 may determine a portion of the video stream 820 that is covered by the first bounding box 861, the second bounding box 862, and the third bounding box 863. The camera device 801 may then send a higher-resolution version of the video stream 820 for the portions bounded by the first bounding box 861, the second bounding box 862, and the third bounding box 863 concurrently while sending a reduced-resolution video stream, including a reduced-resolution version of the first frame 860.

In some embodiments, the camera device 801 may be a part of a camera device network 890. In some embodiments, the camera device network 890 may coordinate between different camera devices to capture target objects and associated characters in a region. For example, the camera device network 890 may track a vehicle across different regions and may offload computing work or transfer data between each other to increase computational efficiency.

Figure 9:
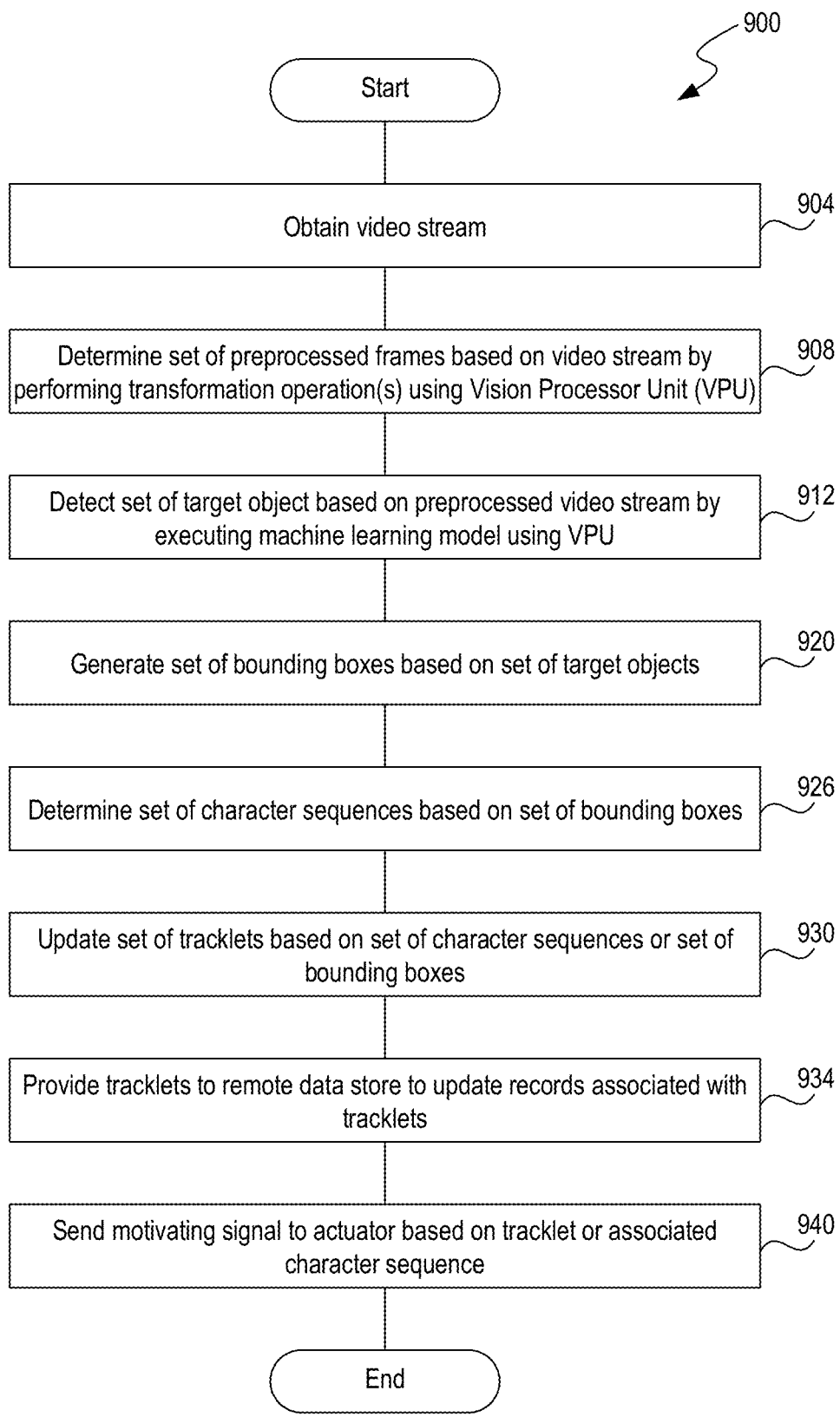
FIG. 9 is a flowchart useful for tracking multiple target objects in real-time operations, in accordance with some embodiments.

FIG. 9 is a flowchart useful for tracking multiple target objects in real-time operations, in accordance with some embodiments. Operations of the process 900 may begin with operations described for block 904. Some embodiments may obtain a video stream, as indicated by block 904. Obtaining a video stream may include collecting visual information using one or more of various types of cameras. These cameras may include cameras capable of collecting light using sensors capable of collecting light in the visible spectrum (e.g., between 450 nm to 780 nm) or light outside the visible spectrum (e.g., infrared light or ultraviolet light).

Some embodiments may collect the video stream using multiple lenses and perform a set of initial aggregation operations to generate one video stream based on the multiple lenses. Some embodiments may process the video stream with one or more video compression standards, such as the H.265 codec standard. Some embodiments may fully or partially reconstruct a compressed image into frames from a compressed form to perform operations described in this disclosure.

Some embodiments may determine a set of preprocessed frames based on the video stream by performing a set of transformation operations, as indicated by block 908. Some embodiments may perform preprocessing operations to transform an image or a plurality of images before performing other operations, where embodiments may use a VPU to perform the set of transformation operations. For example, some embodiments may use a VPU to resize an image or a portion of an image, convert the image from one color scheme into a target color scheme (e.g., perform a YUV2RGB conversion operation). Some embodiments may perform such preprocessing operations or other operations within 1 ms of retrieving a frame from a video stream. For example, some embodiments may receive a video stream at a rate of 20 frames per second, where some embodiments may use a VPU to perform a set of transformation operations on the image of the frame to resize an image, rotate the image, flatten the image, and change a color scheme of the image. Some embodiments may then detect target objects or perform other operations based on each resized, color-converted image of each respective frame.

Some embodiments may detect a set of target objects based on the set of preprocessed frames by executing a machine learning model, as indicated by block 912. Some embodiments may use a VPU to execute the machine learning model. A machine learning model may include a trained neural network that is trained to recognize one or more types of target objects. For example, the machine learning model may include a CNN model trained to recognize a vehicle, a license plate, or another type of object that may include one or more symbols.

As described elsewhere, the VPU may execute computer vision operations with greater efficiency or lower power requirements than a classical CPU or GPU. Some embodiments may use the VPU to perform recognition operations, such as operations to recognize target objects in a frame of a video stream for each frame of the video stream. For example, as a video stream is being recorded at a rate of 20 frames per second, the VPU may perform computer vision operations on each of the frames to detect subregions in the images containing one or more target objects.

Some embodiments may detect an active region and focus object recognition operations within the active region. The active region may restrict recognition operations or other operations to the portion of an image within the active region. In some embodiments, the active region may include a region of interest that is determined using operations described elsewhere in this disclosure. Alternatively, or additionally, the active region may include a region in an image space of a video stream or a frame of the video stream that is defined by detected motion between frames, where only a region that bounds detected motion of a video stream is used for object recognition operations, character recognition operations, or other operations described in this disclosure.

Some embodiments may directly determine a target object or a plurality of target objects by using a VPU to perform object recognition operations on an entire frame or a designated active region of the entire frame. For example, some embodiments may execute a CNN model by using an entire frame as an input to determine a set of license plates. Some embodiments may perform hierarchical object recognition operations by iteratively recognizing objects and then using regions surrounding the recognized objects to recognize additional objects. For example, some embodiments may perform a first recognition operation to detect a set of vehicles depicted in a frame and generate, for the frame, a set of intermediate bounding boxes surrounding the first set of vehicles. Some embodiments may then perform a second recognition operation to detect a set of license plates attached to the vehicles by performing search operations based on the set of intermediate bounding boxes.

Some embodiments may generate a set of bounding boxes based on the set of target objects, as indicated by block 920. In some embodiments, each respective bounding box of a frame may indicate a corresponding boundary surrounding a respective target object in an image space of the video stream used to generate the respective bounding box. Some embodiments may generate a bounding box by using operations described for FIG. 3. Alternatively, or additionally, some embodiments may modify one or more operations described for FIG. 3 to determine a bounding box based on a detected target object, such as a detected license plate.

Some embodiments may determine a set of character sequences based on the set of bounding boxes, as indicated by block 926. For example, some embodiments may determine character sequences by, for each respective bounding box of a group of bounding boxes, performing a set of OCR operations to determine a respective character sequence of the character sequences. Some embodiments may identify each character in a target object, such as a license plate, by performing operations described for FIG. 1. Alternatively, or additionally, some embodiments may perform multiline character recognition operations as described for FIG. 3 based on an image portion bounded by a bounding box to determine a character sequence associated with the bounding box. Alternatively, or additionally, some embodiments may perform stacked character recognition operations as described for FIG. 4 based on an image portion bounded by a bounding box to determine a character sequence associated with the bounding box.

Some embodiments may aggregate a plurality of image portions based on a tracklet, where each image portion is bounded by a bounding box of the tracklet to determine an aggregated image. For example, some embodiments may obtain image portions of a license plate across five frames, combining the image portions using an averaging technique to generate an aggregated image. Some embodiments may then perform a set of OCR operations to determine a character sequence of the aggregated image, where the character sequence may correspond to the most recent frame used to generate the aggregated image.

Alternatively, or additionally, some embodiments may calculate candidate character sequences for each respective frame of a frame sequence based on the image portions surrounded by the bounding boxes of a tracklet. Some embodiments may then determine a respective confidence value associated with each respective candidate character sequence. Some embodiments may then select the candidate sequence having a greatest confidence of the associated confidence values, where the selected candidate character sequence is chosen to be the character sequence associated with the tracklet. When computing a confidence, some embodiments may use a voting table to assign a confidence value for a predicted character sequence, where the use of a voting table may reduce the computational cost of determining the confidence value.

Some embodiments may update a set of tracklets based on the set of character sequences or set of bounding boxes, as indicated by block 930. As used in this disclosure, updating a tracklet may include modifying an existing tracklet or generating a new tracklet. Some embodiments may update a set of tracklets to indicate a corresponding set of bounding boxes. For example, some embodiments may, for each respective bounding box surrounding a different target object, updated a respective tracklet to include, link to, or otherwise indicate the respective bounding box. Furthermore, as described elsewhere in this disclosure, some embodiments may recognize a set of characters based on an image bounded by a bounding box using recognition operations. Some embodiments may then associate the recognized set of characters with the tracklet that indicates the bounding box.

Some embodiments may generate a tracklet by associating different bounding boxes of different frames with each other. For example, some embodiments may determine that a first bounding box is associated with a second bounding box by using an IoU algorithm to determine a ratio. Some embodiments may set the ratio to be a ratio of the intersection region of the first and second bounding boxes to the union region of the first and second bounding boxes across the two different frames. In response to detecting that the ratio satisfies an IoU threshold (e.g., by being greater than an IoU threshold of 95%), some embodiments may associate the bounding boxes with each other by indicating the bounding boxes with the same tracklet. Alternatively, or additionally, some embodiments may determine that an edit distance of a pair of character sequences associated with a corresponding pair of bounding boxes is greater than a threshold and not associate the pair of bounding boxes with the same tracklet.

Some embodiments may perform one or more operations described for blocks 908, 912, 920, 926, and 930 in real-time. Performing a set of operations in real-time with respect to a video stream may include performing the set of operations within 1 ms of receiving a frame of the video stream, within 10 ms of receiving the frame, within 100 ms of receiving the frame, etc. In some embodiments, the set of operations may include the set of transformation operations described for block 908, the set of recognition operations described for block 912, the set of bounding box generation operations described for block 920, etc. Some embodiments may calibrate operations of the process 900 to satisfy real-time operations for a camera collecting and storing images at 10 fps, 20 fps, 30 fps, 50 fps, 60 fps, 120 fps, or some other frame rate.

Some embodiments may provide the set of tracklets to a remote data store to update records associated with the set of tracklets, as indicated by block 934. Some embodiments may send and store tracklet data in the form of values characterizing a sequence of bounding boxes and data used to derive the bounding boxes or data derived from the bounding boxes. Furthermore, some embodiments may send or store related data, such as video stream data used to generate the bounding boxes. Alternatively, or additionally, some embodiments may store the set of tracklets of a video stream collected by a camera device and a set of character sequences associated with the set of tracklets in a local non-transitory memory of the camera device.

Some embodiments may increase the efficiency of data storage or data presentation by selecting one or more specific images to present. For example, some embodiments may determine which image to select based on an image quality score. Some embodiments may determine an image quality score by determining an object sharpness and total area that the object is taking up in an image space. For example, some embodiments may compare five images of a license plate collected from a corresponding set of five frames. Some embodiments may then determine a respective object sharpness of an image of the license plate of the five frames and then multiply the respective sharpness by the respective object area of the corresponding bounding box of each respective license plate image to determine a respective image quality score. Some embodiments may then select the license plate image as a presentation image based on which frame corresponds with the greatest image quality score. A server or client computing device may be configured to display the presentation image in association with a vehicle, tracklet, or character sequence.

Some embodiments may send a motivating signal to an actuator based on a tracklet or associated character sequence, as indicated by block 940. Some embodiments may use recognized characters to initiate the actuation. For example, some embodiments may determine that a first character sequence (e.g., a license plate number) matches a permitted character sequence list and, in response, send a motivating signal or otherwise motivate an actuator controlling a door or a gate to permit entry or exit from a designated area. Furthermore, some embodiments may be configured to permit actuation based on multiple inputs. For example, some embodiments may obtain a license plate number using operations described for blocks 904, 908, 912, 920, 926, or 930 and, in response to a match of the license plate number with a permitted number, determine whether a wireless signal was received and whether an identifier encoded in the wireless signal matches a target signal value. In response to a determination that the target signal value matches an identifier of a stored set of authenticated identifiers, some embodiments may motivate an actuator to open a gate and permit entry or exit from an area.

Computer System

Figure 10:
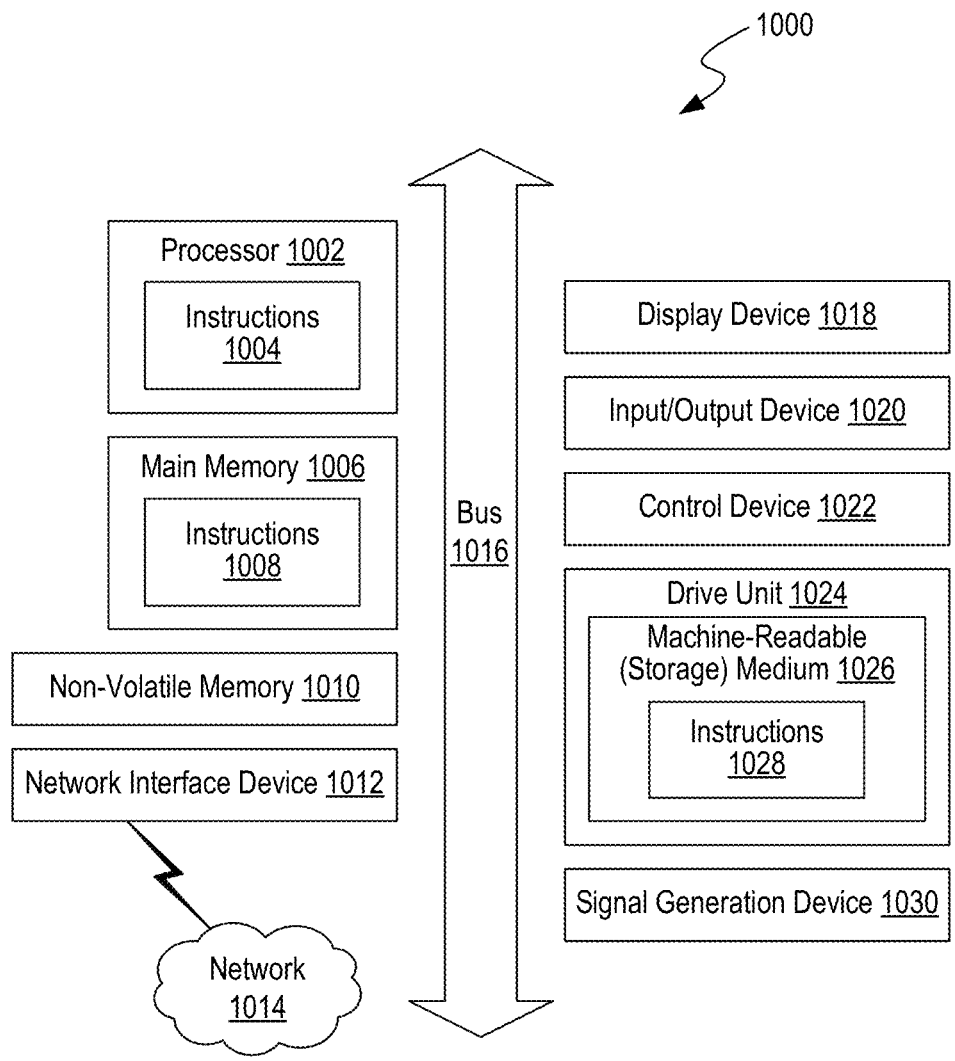
FIG. 10 is a block diagram that illustrates an example of a computing system 1000 in which at least some operations described herein can be implemented.

FIG. 10 is a block diagram that illustrates an example of a computing system 1000 in which at least some operations described herein can be implemented. As shown, the computing system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a set of machine-readable media 1026, such as a storage medium, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computing system 1000 is intended to illustrate a hardware device on which components illustrated or described relative to the examples of the figures and any other components described in this specification can be implemented.

The computing system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementation, the computing system 1000 can be an embedded computer system, a system-on-chip (SOC), a single-board computer system (SBC) or a distributed system, such as a mesh of computer systems, or include one or more cloud components in one or more networks. Where appropriate, one or more computing systems 1000 can perform operations in real-time, near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, set of non-transitory, machine-readable media 1026) can be local, remote, or distributed. Although shown as a single medium, the set of non-transitory, machine-readable media 1026 can include multiple media (e.g., a centralized/distributed database and/or associated caches and servers) that store one or more sets of instructions 1028. The set of non-transitory, machine-readable media 1026 can include any medium that is capable of storing, encoding, or carrying a set of instructions for execution by the computing system 1000. The set of non-transitory, machine-readable media 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media, such as volatile and non-volatile memory devices 1010, removable flash memory, hard disk drives, optical disks, and transmission-type media, such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

Enumerated Embodiments

1. The present techniques will be better understood with reference to the following enumerated embodiments:

2. A method comprising: obtaining, with an image sensor of a camera device, a video stream; detecting a plurality of target objects by executing, with a vision processor unit of the camera device, a neural network model based on a frame of the video stream; generating a plurality of bounding boxes, wherein each respective bounding box indicates a boundary surrounding a respective license plate in an image space of the video stream; determining a plurality of character sequences by, for each respective bounding box of the plurality of bounding boxes, performing a set of optical character recognition (OCR) operations to determine a respective character sequence of the plurality of character sequences, wherein the respective character sequence is bounded by the respective bounding box; updating a plurality of tracklets to indicate the plurality of bounding boxes, wherein each respective updated tracklet of the updated plurality of tracklets indicates a respective bounding box of the plurality of bounding boxes; and storing the plurality of tracklets in association with the plurality of character sequences in a memory of the camera device.

3. A method comprising: obtaining, with an image sensor of a camera device, a video stream; detecting a plurality of target objects by executing, with a vision processor unit of the camera device, a neural network model based on the video stream; generating a plurality of bounding boxes, wherein each respective bounding box indicates a boundary surrounding a respective license plate in an image space of the video stream; determining a plurality of character sequences by, for each respective bounding box of the plurality of bounding boxes, performing a set of optical character recognition (OCR) operations to determine a respective character sequence of the plurality of character sequences, wherein the respective character sequence is encompassed by the respective bounding box; updating a plurality of tracklets to indicate the plurality of bounding boxes, wherein each respective updated tracklet of the updated plurality of tracklets indicates a respective bounding box of the plurality of bounding boxes; and storing the plurality of tracklets in association with the plurality of character sequences in a memory of the camera device.

4. A method comprising: obtaining, with an image sensor of a camera device, a video stream comprising a frame sequence; for each respective frame of the video stream, executing, with a vision processor unit of the camera device, a neural network model based on the frame sequence to detect a respective plurality of license plates for the respective frame; generating a plurality of bounding boxes based on the plurality of license plates, wherein each respective bounding box indicates a boundary surrounding a respective license plate in an image space of the video stream; determining a plurality of character sequences by performing, for each respective bounding box of the plurality of bounding boxes, a set of optical character recognition (OCR) operations to determine a respective character sequence of the plurality of character sequences, wherein the respective character sequence is bounded by the respective bounding box; updating a plurality of tracklets to indicate the plurality of bounding boxes, wherein each respective updated tracklet of the updated plurality of tracklets indicates a respective bounding box of the plurality of bounding boxes; and storing the plurality of tracklets in association with the sequence of characters in a memory of the camera device.

5. The method of any embodiment of embodiments 1 to 3, wherein: the plurality of tracklets comprises a first tracklet; the first tracklet indicates a subset of bounding boxes corresponding with a subset of frames of the video stream; and determining the plurality of character sequences comprises, for a first character sequence of the plurality of character sequences: aggregating a plurality of image portions bounded by the subset of bounding boxes to determine an aggregated image; and performing OCR operations based on the aggregated image to determine the first character sequence.

6. The method of any embodiment of embodiments 1 to 4, wherein the plurality of tracklets comprises a first tracklet; the first tracklet indicates a subset of bounding boxes corresponding with a subset of frames of the video stream, and wherein the plurality of character sequences comprises a first character sequence, further comprising: determining a subset of candidate character sequences based on the subset of frames by, for each respective frame of the subset of frames: determining a respective candidate character sequence of the subset of candidate character sequences; determining a common length based on the subset of candidate character sequences; determining a plurality of confidence values associated with the subset of candidate character sequences based on the common length, wherein each respective confidence is associated with the respective candidate character sequence of the subset of candidate character sequences; and determining the first character sequence based on the subset of candidate character sequences and the plurality of confidence values.

7. The method of embodiment 5, further comprising: obtaining a voting table; and determining the plurality of confidence values based on the voting table.

8. The method of any embodiment of embodiments 1 to 6, wherein determining the plurality of character sequences comprises: resizing an image portion surrounded by a first bounding box of the plurality of bounding boxes; and performing OCR operations based on the resized image portion to obtain a first character sequence of the plurality of character sequences.

9. The method of embodiment 7, further comprising sending the first character sequence to a server, wherein the server broadcasts the first character sequence to a plurality of client computing devices.

10. The method of any embodiment of embodiments 1 to 8, wherein the plurality of tracklets comprises a first tracklet, and wherein the first tracklet comprises a first bounding box of the frame, further comprising: detecting motion based on changes between frames of the video stream; determining an active region in the image space based on the motion, wherein executing the neural network model comprises detecting a target object in the active region.

11. The method of any embodiment of embodiments 1 to 9, wherein the plurality of character sequences comprises a first character sequence, and wherein the first character sequence is bounded by a first bounding box of the frame, the method further comprising: randomly selecting a character of the first character sequence; determining a portion of the frame corresponding with the selected character; modifying the frame to obfuscate the portion of the frame; and sending the frame to a remote data store via a network connection after modifying the frame.

12. The method of any embodiment of embodiments 1 to 10, wherein determining the plurality of character sequences comprises: generating a color-converted image by converting a color scheme of the frame of the plurality of frames to a target color scheme; and determining a first character sequence based on the color-converted image.

13. The method of any embodiment of embodiments 1 to 11, wherein the plurality of target objects comprises a plurality of license plates, and wherein the neural network model is a first neural network model, and wherein detecting the plurality of license plates comprises: detecting a plurality of vehicles using a second neural network model; determining a plurality of intermediate bounding boxes based on the plurality of vehicles, wherein each respective intermediate bounding box of the plurality of intermediate bounding boxes surrounds a respective vehicle; and detecting the plurality of license plates based on the plurality of intermediate bounding boxes.

14. The method of any embodiment of embodiments 1 to 12, the method further comprising: determining a presentation image of a frame sequence by, for each respective frame of the frame sequence, determining an image quality score based on a respective object sharpness and a respective object area based on the respective bounding box; and sending the presentation image to a remote data store.

15. The method of any embodiment of embodiments 1 to 13, wherein: the video stream comprises a first frame and a second frame; a first tracklet of the plurality of tracklets indicates a first bounding box associated with the first frame of the video stream and a second bounding box associated with the second frame; the first bounding box is associated with the first tracklet, and wherein the first frame and the second frame are consecutive frames; determining the first tracklet comprises: determining an intersection region in an image space of the first bounding box and the second bounding box; determining a union region in the image space of the first bounding box and the second bounding box; determining a ratio based on the intersection region and the union region; and in response to a detection that the ratio satisfies a threshold, associating the first bounding box with the second bounding box.

16. The method of any embodiment of embodiments 1 to 14, wherein: the video stream comprises a first frame and a second frame; a first tracklet of the plurality of tracklets indicates a first bounding box associated with the first frame of the video stream; the first tracklet indicates a second bounding box associated with the second frame; the first bounding box is associated with the first tracklet; the first frame and the second frame are consecutive frames; determining the plurality of character sequences comprises determining a first character sequence of the first frame, and determining a second character sequence of the second frame; and updating the first tracklet comprises: determining an edit distance based on the first character sequence and the second character sequence; and in response to a detection that the edit distance satisfies an edit distance threshold, associating the first bounding box with the second bounding box.

17. The method of any embodiment of embodiments 1 to 15, the method further comprising: detecting that a first character sequence matches a permitted character sequence list; retrieving a record based on the first character sequence; determining a duration associated with the first character sequence; determining a transaction amount based on the duration; and transmitting a request based on the transaction amount to a server.

18. The method of any embodiment of embodiments 1 to 16, the method further comprising: converting the video stream into a reduced-resolution video stream; and sending the reduced-resolution video stream and the plurality of tracklets to a client computing device, wherein a user interface of the client computing device displays the reduced-resolution video stream and a visual representation of the plurality of bounding boxes.

19. The method of any embodiment of embodiments 1 to 17, wherein the plurality of bounding boxes comprises at least three bounding boxes.

20. The method of any embodiment of embodiments 1 to 18, the method further comprising: detecting that a first character sequence matches a permitted character sequence list; and motivating an actuator based on a detection that the first character sequence matches the permitted character sequence list.

21. The method of embodiment 19, wherein motivating the actuator further comprises: receiving, at a wireless signal receiver, an identifier, wherein motivating the actuator comprises motivating the actuator based on a detection that the identifier matches with a value of a stored set of authenticated identifiers.

What is claimed is:

1. A device comprising one or more memory devices storing instructions and one or more processors configured to execute the instructions that, when executed, cause operations comprising:
obtaining, with an image sensor of a camera device, a first video stream comprising a frame sequence;
detecting motion based on changes between a pair of frames of the first video stream;
determining a set of active regions in an image space of the first video stream based on the motion;
for each respective frame of the first video stream, executing, with a vision processor unit of the camera device, a neural network model based on the frame sequence to detect a respective plurality of license plates for the respective frame wherein executing the neural network model comprises restricting detection within the set of active regions;
generating a plurality of bounding boxes based on the plurality of license plates of the first video stream, wherein each respective bounding box indicates a boundary surrounding a respective license plate in the image space;
determining a plurality of character sequences by performing, for each respective bounding box of the plurality of bounding boxes, a set of optical character recognition (OCR) operations to determine a respective character sequence of the plurality of character sequences, wherein the respective character sequence is bounded by the respective bounding box;
updating a plurality of tracklets to indicate the plurality of bounding boxes, wherein each respective updated tracklet of the updated plurality of tracklets indicates a respective bounding box of the plurality of bounding boxes, and wherein the plurality of tracklets comprises a first tracklet, and wherein the first tracklet comprises a first bounding box of the first frame;
storing the plurality of tracklets in association with the sequence of characters in a memory of the camera device;
compressing the first video stream to a lower-resolution video stream;
isolating a portion of the first video stream to generate a restricted higher-resolution video stream that includes the set of active regions in the image space; and
sending the plurality of character sequences, the plurality of tracklets, the lower-resolution video stream, and the restricted higher-resolution video stream to a client computing device.

2. A method comprising:
obtaining, with an image sensor of a camera device, a first video stream;
detecting motion based on changes between a pair of frames of the first video stream;
determining a set of active regions in an image space of the first video stream based on the motion;
detecting a plurality of target objects by executing, with a vision processor unit of the camera device, a neural network model based on a first frame of the pair of frames of the first video stream, wherein executing the neural network model comprises restricting detection within the set of active regions;
generating a plurality of bounding boxes, wherein each respective bounding box indicates a boundary surrounding a respective license plate in the image space;
determining a plurality of character sequences by, for each respective bounding box of the plurality of bounding boxes, performing a set of optical character recognition (OCR) operations to determine a respective character sequence of the plurality of character sequences, wherein the respective character sequence is bounded by the respective bounding box;
updating a plurality of tracklets to indicate the plurality of bounding boxes, wherein each respective updated tracklet of the updated plurality of tracklets indicates a respective bounding box of the plurality of bounding boxes, and wherein the plurality of tracklets comprises a first tracklet, and wherein the first tracklet comprises a first bounding box of the first frame;
storing the plurality of tracklets in association with the plurality of character sequences in a memory of the camera device;
compressing the first video stream to a lower-resolution video stream;

isolating a portion of the first video stream to generate a restricted higher-resolution video stream that includes the set of active regions in the image space; and
sending the plurality of character sequences, the plurality of tracklets, the lower-resolution video stream, and the restricted higher-resolution video stream to a client computing device.

3. The method of claim 2, wherein:
the first tracklet indicates a subset of bounding boxes corresponding with a subset of frames of the first video stream; and
determining the plurality of character sequences comprises, for a first character sequence of the plurality of character sequences:
aggregating a plurality of image portions bounded by the subset of bounding boxes to determine an aggregated image by combining the plurality of image portions using an averaging technique; and
performing OCR operations based on the aggregated image to determine the first character sequence.

4. The method of claim 2, and wherein
the first tracklet indicates a subset of bounding boxes corresponding with a subset of frames of the first video stream, and wherein the plurality of character sequences comprises a first character sequence, the method further comprising:
determining a subset of candidate character sequences based on the subset of frames by, for each respective frame of the subset of frames:
determining a respective candidate character sequence of the subset of candidate character sequences;
determining a common length based on the subset of candidate character sequences;
determining a plurality of confidence values associated with the subset of candidate character sequences based on the common length, wherein each respective confidence is associated with the respective candidate character sequence of the subset of candidate character sequences; and
determining the first character sequence based on the subset of candidate character sequences and the plurality of confidence values.

5. The method of claim 4, further comprising:
obtaining a voting table; and
determining the plurality of confidence values based on the voting table.

6. The method of claim 2, wherein determining the plurality of character sequences comprises:
resizing an image portion surrounded by the first bounding box of the plurality of bounding boxes; and
performing OCR operations based on the resized image portion to obtain a first character sequence of the plurality of character sequences.

7. The method of claim 6, further comprising sending the first character sequence to a server, wherein the server broadcasts the first character sequence to a plurality of client computing devices.

8. The method of claim 2, wherein the plurality of character sequences comprises a first character sequence, and wherein the first character sequence is bounded by the first bounding box, the method further comprising:
randomly selecting a candidate character of the first character sequence;
determining a portion of the first frame corresponding with the candidate character;
modifying the first frame to obfuscate the portion of the first frame; and
sending the first frame to a remote data store via a network connection after modifying the first frame.

9. The method of claim 2, wherein determining the plurality of character sequences comprises:
generating a color-converted image by converting a color scheme of the first frame to a target color scheme; and
determining a first character sequence based on the color-converted image.

10. The method of claim 2, further comprising activating a light sensor in response to detecting the detecting the motion.

11. A set of non-transitory, machine-readable media storing program instructions that, when executed by a set of processors, performs operations comprising:
obtaining, with an image sensor of a camera device, a first video stream;
detecting motion based on changes between a pair of frames of the first video stream;
determining a set of active regions in an image space of the first video stream based on the motion;
detecting a plurality of target objects by executing, with a vision processor unit of the camera device, a neural network model based on the first video stream, wherein executing the neural network model comprises restricting detection within the set of active regions;
generating a plurality of bounding boxes, wherein each respective bounding box indicates a boundary surrounding a respective license plate in the image space;
determining a plurality of character sequences by, for each respective bounding box of the plurality of bounding boxes, performing a set of optical character recognition (OCR) operations to determine a respective character sequence of the plurality of character sequences, wherein the respective character sequence is encompassed by the respective bounding box;
updating a plurality of tracklets to indicate the plurality of bounding boxes, wherein each respective updated tracklet of the updated plurality of tracklets indicates a respective bounding box of the plurality of bounding boxes and wherein the plurality of tracklets comprises a first tracklet, and wherein the first tracklet comprises a first bounding box of the first frame;
storing the plurality of tracklets in association with the plurality of character sequences in a memory of the camera device;
compressing the first video stream to a lower-resolution video stream;
isolating a portion of the first video stream to generate a restricted higher-resolution video stream that includes the set of active regions in the image space; and
sending the lower-resolution video stream and the restricted higher-resolution video stream to a client computing device.

12. The set of non-transitory, machine-readable media of claim 11, wherein the plurality of target objects comprises a plurality of license plates, and wherein the neural network model is a first neural network model, and wherein detecting the plurality of license plates comprises:
detecting a plurality of vehicles using a second neural network model;
determining a plurality of intermediate bounding boxes based on the plurality of vehicles, wherein each respective intermediate bounding box of the plurality of intermediate bounding boxes surrounds a respective vehicle; and
detecting the plurality of license plates based on the plurality of intermediate bounding boxes.

13. The set of non-transitory, machine-readable media of claim 11, the operations further comprising:
- determining a presentation image of a frame sequence by, for each respective frame of the frame sequence, determining an image quality score based on a respective object sharpness and a respective object area based on the respective bounding box; and
- sending the presentation image to a remote data store.

14. The set of non-transitory, machine-readable media of claim 11, wherein:
- the first video stream comprises a second frame;
- a first tracklet of the plurality of tracklets indicates the first bounding box associated with the first frame of the first video stream and a second bounding box associated with the second frame;
- the first bounding box is associated with the first tracklet, and wherein the first frame and the second frame are consecutive frames; and
- determining the first tracklet comprises:
  - determining an intersection region in an image space of the first bounding box and the second bounding box;
  - determining a union region in the image space of the first bounding box and the second bounding box;
  - determining a ratio based on the intersection region and the union region; and
  - in response to a detection that the ratio satisfies a threshold, associating the first bounding box with the second bounding box.

15. The set of non-transitory, machine-readable media of claim 11, wherein:
- the first video stream comprises a first frame and a second frame;
- the first tracklet of the plurality of tracklets indicates the first bounding box associated with the first frame of the first video stream;
- the first tracklet indicates a second bounding box associated with the second frame;
- the first bounding box is associated with the first tracklet;
- the first frame and the second frame are consecutive frames;
- determining the plurality of character sequences comprises determining a first character sequence of the first frame, and determining a second character sequence of the second frame; and
- updating the first tracklet comprises:
  - determining an edit distance based on the first character sequence and the second character sequence; and
  - in response to a detection that the edit distance satisfies an edit distance threshold, associating the first bounding box with the second bounding box.

16. The set of non-transitory, machine-readable media of claim 11, the operations further comprising:
- detecting that a first character sequence matches a permitted character sequence list;
- retrieving a record based on the first character sequence;
- determining a duration associated with the first character sequence;
- determining a transaction amount based on the duration; and
- transmitting a request based on the transaction amount to a server.

17. The set of non-transitory, machine-readable media of claim 11, wherein a user interface of the client computing device displays the lower-resolution video stream, the restricted higher-resolution video stream, and a visual representation of the plurality of bounding boxes.

18. The set of non-transitory, machine-readable media of claim 11, wherein the plurality of bounding boxes comprises at least three bounding boxes.

19. The set of non-transitory, machine-readable media of claim 11, the operations further comprising:
- detecting that a first character sequence matches a permitted character sequence list; and
- motivating an actuator based on a detection that the first character sequence matches the permitted character sequence list.

20. The set of non-transitory, machine-readable media of claim 19, wherein motivating the actuator further comprises:
- receiving, at a wireless signal receiver, an identifier, wherein motivating the actuator comprises motivating the actuator based on a detection that the identifier matches with a value of a stored set of authenticated identifiers.

* * * * *